US011930253B2

United States Patent
Tange et al.

(10) Patent No.: US 11,930,253 B2
(45) Date of Patent: Mar. 12, 2024

(54) INFORMATION PROCESSING SYSTEM, INFORMATION PROCESSING METHOD, AND STORAGE MEDIUM

(71) Applicant: Sony Group Corporation, Tokyo (JP)

(72) Inventors: Akira Tange, Tokyo (JP); Hideo Nagasaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 85 days.

(21) Appl. No.: 17/780,532

(22) PCT Filed: Nov. 20, 2020

(86) PCT No.: PCT/JP2020/043423
§ 371 (c)(1),
(2) Date: May 27, 2022

(87) PCT Pub. No.: WO2021/111905
PCT Pub. Date: Jun. 10, 2021

(65) Prior Publication Data
US 2023/0353843 A1    Nov. 2, 2023

(30) Foreign Application Priority Data

Dec. 6, 2019  (JP) ................. 2019-221522

(51) Int. Cl.
*H04N 21/854* (2011.01)
*H04N 21/81* (2011.01)
*H04N 21/84* (2011.01)

(52) U.S. Cl.
CPC ....... *H04N 21/854* (2013.01); *H04N 21/8113* (2013.01); *H04N 21/84* (2013.01)

(58) Field of Classification Search
CPC ... H04N 21/854; H04N 21/8113; H04N 21/84
See application file for complete search history.

(56) References Cited

U.S. PATENT DOCUMENTS

| 2004/0057348 | A1 | 3/2004 | Shteyn |
| 2004/0133855 | A1 | 7/2004 | Blair et al. |
| 2007/0091357 | A1 | 4/2007 | Konno |
| 2010/0107082 | A1* | 4/2010 | Ban .................... H04N 21/4325 715/733 |

(Continued)

FOREIGN PATENT DOCUMENTS

| EP | 3349394 A | 7/2018 |
| EP | 4071751 A1 | 10/2022 |

(Continued)

OTHER PUBLICATIONS

International Search Report and Written Opinion dated Feb. 9, 2021, received for PCT Application PCT/JP2020/043423, Filed on Nov. 20, 2020, 10 pages including English Translation.

*Primary Examiner* — Mulugeta Mengesha
(74) *Attorney, Agent, or Firm* — XSENSUS LLP

(57) ABSTRACT

An information processing system has a function of generating a script including identification information of content and comment information on the basis of an input from a creator, and performing control to store the script in a predetermined storage medium to be browsable by a user, and has a function of supporting generation of the script by the creator.

11 Claims, 30 Drawing Sheets

(56) References Cited

U.S. PATENT DOCUMENTS

| | | | | |
|---|---|---|---|---|
| 2010/0121912 A1* | 5/2010 | Kawakami | ......... | H04N 21/8106 |
| | | | | 709/203 |
| 2013/0262118 A1* | 10/2013 | Saeki | .................... | G05B 15/02 |
| | | | | 704/260 |
| 2014/0019446 A1 | 1/2014 | He | | |
| 2018/0332357 A1* | 11/2018 | Nagasaka | .......... | H04N 21/4394 |
| 2019/0206399 A1 | 7/2019 | Garmark | | |
| 2021/0004128 A1* | 1/2021 | Carrigan | ............ | H04L 67/1097 |

FOREIGN PATENT DOCUMENTS

| | | |
|---|---|---|
| JP | 2003-187092 A | 7/2003 |
| JP | 2004-5321 A | 1/2004 |
| JP | 2007-257562 A | 10/2007 |
| JP | 2013-246681 A | 12/2013 |
| JP | 2014082582 A | 5/2014 |
| KR | 10-1721155 B1 | 4/2017 |
| WO | 02/017639 A2 | 2/2002 |
| WO | 2008/001500 A1 | 1/2008 |

\* cited by examiner

FOREWORD AND AFTERWORD RANKING OF SONG abc

| FIRST: | FOREWORD A<br>AFTERWORD B |
|---|---|
| SECOND: | FOREWORD C<br>AFTERWORD D |
| THIRD: | FOREWORD E<br>AFTERWORD F |
| FOURTH: | FOREWORD G<br>AFTERWORD H |
| FIFTH: | FOREWORD I<br>AFTERWORD J |

IDOL GROUP A
FOREWORD OF "SONG xyz"

SONG abc LYRICS

SONG: IDOL GROUP A
LYRICS: SONG WRITER B
COMPOSITION: COMPOSER C

Oh ··· abc abc abc
abc abc abc

⊞ INFORMATION SITE

TOP PAGE  NEWS  POPULAR ARTICLES  COLUMNS  SPECIAL ISSUE/INTERVIEWS

REFRESHING "SONG abc"
BY IDOL GROUP A DANCING AT INDOOR POOL

INFORMATION PROCESSING SYSTEM, INFORMATION PROCESSING METHOD, AND STORAGE MEDIUM

CROSS-REFERENCE TO RELATED APPLICATIONS

The present application is based on PCT filing PCT/JP2020/043423, filed Nov. 20, 2020, which claims priority to JP 2019-221522, filed Dec. 6, 2019, the entire contents of each are incorporated herein by reference.

TECHNICAL FIELD

The present technology relates to an information processing system, an information processing method, and a storage medium, and particularly relates to an information processing system, an information processing method, and a storage medium capable of more easily performing support for providing content and a comment thereof together with the content.

BACKGROUND ART

In recent years, with diversification of methods for providing content, various services and devices have been provided (see, for example, Patent Documents 1 to 3).

Patent Document 1 discloses that when a user inputs a text, the text is transmitted to a server, text-voice synthesis is performed on the server, a voice file output is stored in a predetermined area on the server, a link to the voice file is generated, and the link is transmitted to a client PC.

Patent Document 2 discloses a system that performs voice-synthesizes on text data to generate synthesized voice, and generates voice content in which the synthesized voice and the voice data are organized in a predetermined order.

Patent Document 3 discloses a system capable of giving an evaluation on the basis of a second user to a playlist generated based on a first user provided from a server or the like so that a difference between the playlist and preferences of the second user can be grasped.

CITATION LIST

Patent Document

Patent Document 1: Japanese Patent Application Laid-Open No. 2007-257562
Patent Document 2: WO 2008/001500
Patent Document 3: Japanese Patent Application Laid-Open No. 2013-246681

SUMMARY OF THE INVENTION

Problems to be Solved by the Invention

Meanwhile, when providing content and a comment regarding the content or the like together, it is required to support for providing the content and the comment thereof more easily.

The present technology has been made in view of such a situation, and an object thereof is to be capable of performing support for providing content and a comment thereof together with the content more easily.

Solutions to Problems

An information processing system according to one aspect of the present technology is an information processing system including a control unit that generates a script including identification information of content and comment information on the basis of an input from a creator, and performs control to store the script in a predetermined storage medium to be browsable by a user, in which the control unit has a function of supporting generation of the script by the creator.

An information processing method according to an aspect of the present technology is an information processing method including, by an information processing device, generating a script including identification information of content and comment information on the basis of an input from a creator, and performing control to store the script in a predetermined storage medium to be browsable by a user, and supporting generation of the script by the creator.

A storage medium according to one aspect of the present technology is a storage medium recording a program for causing a computer to function as an information processing device including a control unit that generates a script including identification information of content and comment information on the basis of an input from a creator, and performs control to store the script in a predetermined storage medium to be browsable by a user, in which the control unit has a function of supporting generation of the script by the creator.

In the content providing system, the content providing method, and the storage medium according to one aspect of the present technology, a script including identification information of content and comment information is generated on the basis of an input from a creator, and control is performed to store the script in a predetermined storage medium to be browsable by a user. Furthermore, generation of the script by the creator is supported.

BRIEF DESCRIPTION OF DRAWINGS

FIG. 26 is a diagram illustrating an example of presentation of a foreword and an afterword ranking of songs.

FIG. 27 is a diagram illustrating an example of presentation of a foreword and an afterword which are similar.

FIG. 28 is a diagram illustrating an example of presentation of lyrics of a song.

FIG. 29 is a diagram illustrating an example of presentation of a related web page.

MODE FOR CARRYING OUT THE INVENTION

Hereinafter, embodiments of the present technology will be described with reference to the drawings. The description will be made in the following order.
1. First embodiment: script generation support function (basic configuration)
2. Second embodiment: song candidate list presentation function
3. Third embodiment: program automatic generation function
4. Fourth embodiment: popular foreword and afterword presentation function
5. Fifth embodiment: foreword and afterword quotation return function
6. Modification example
7. Configuration of computer <Representative Diagram>

Figure 1:
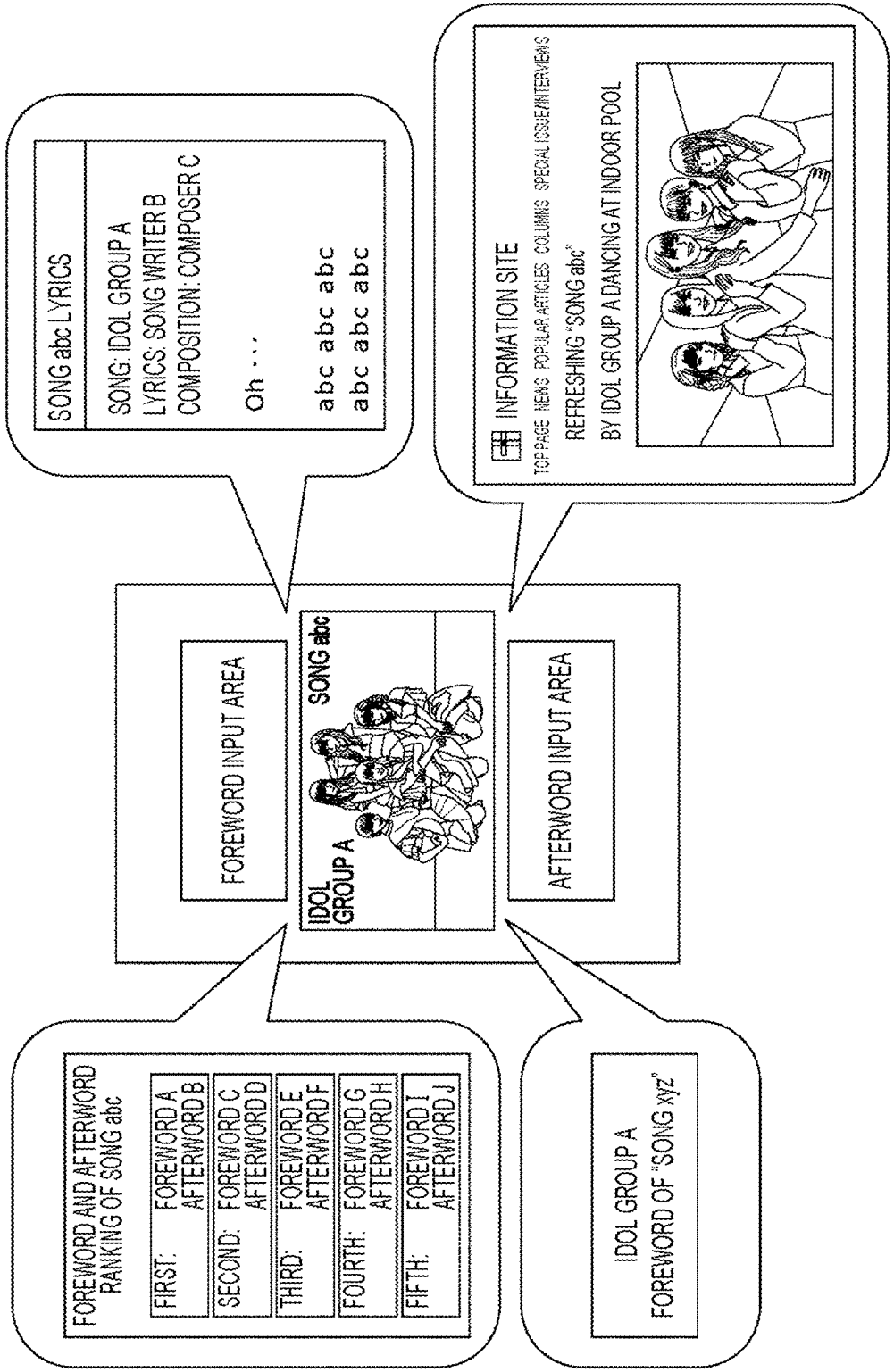
FIG. 1 is a representative diagram illustrating an outline of the present technology.

FIG. 1 is a representative diagram illustrating an outline of the present technology.

The present technology is to generate a script for providing content and a comment thereof more easily by performing support for providing content and a comment regarding the content or the like together when the content is programmed.

In FIG. 1, a creator operates the UI of the program creation tool to set a foreword and an afterword for a "song abc" of an "idle group A".

At this time, the program creation tool supports creation of the program by the creator by presenting popularity ranking of forewords and afterwords of the "song abc", presenting the foreword of a "song xyz", which is a similar song to the "song abc", presenting the lyrics of the "song abc", and presenting a web page related to the "idle group A".

Since the creator can set the foreword, the afterword, and the like while checking related information presented by the program creation tool, the creator can generate a script of the program more easily.

1. First Embodiment (Outline of Virtual Podcast System)

Figure 2:
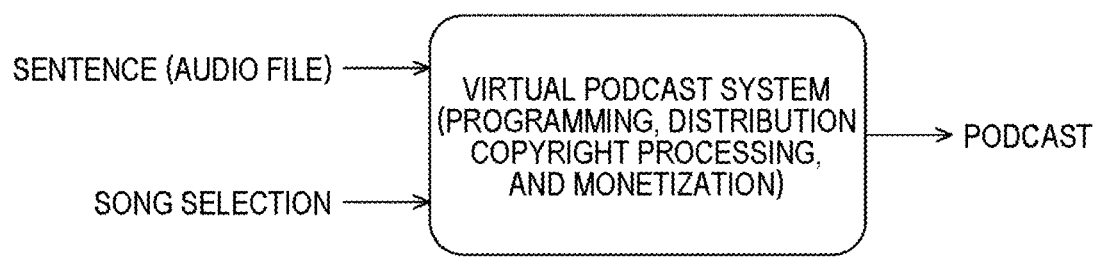
FIG. 2 is a diagram illustrating an outline of a content providing system to which the present technology is applied.

FIG. 2 illustrates an outline of a content providing system to which the present technology is applied. In the example of FIG. 2, a virtual podcast system is illustrated as an embodiment of the content providing system to which the present technology is applied.

The virtual podcast system is a system in which a creator can create a podcast program simply by operating his or her terminal device to select a song and write a sentence. Podcasting is one of methods for disclosing audio and video data files on the Internet, and is a kind of Internet radio and Internet television. Note that the sentence is not limited to text, and may be provided as a voice file.

The podcast program created by the creator is registered in a distribution server. Thus, the user can operate the user's own terminal device and reproduce the podcast program distributed from the distribution server, so as to view or listen to the program.

Meanwhile, from the creator who distributes the podcast program, he or she would like to efficiently distribute the podcast program created by himself or herself to allow more users to view or listen to the podcast program.

Furthermore, in a case where a song is distributed through the podcast, copyright processing of the song occurs for the creator who performs the distribution, and thus such work is troublesome for the creator. Accordingly, he or she should want another person to perform copyright processing of the song on his or her behalf.

In recent years, in a video distribution site, a creator opens his or her own video distribution channel and transmits information through video content of various themes, and the creator obtains, as a reward for providing the video content to users, a reward such as advertisement revenue according to the number of times of reproduction of a video, or advertisement revenue due to creation of a tie-up video with an advertiser.

Also for the creator who distributes the podcast program, rewards for the podcast program created by himself or herself is an extremely important concern, and he or she would want to have returns of appropriate rewards.

The above-described programing, distribution copyright processing, and monetization are matters that cannot be avoided for creators who distribute podcast programs, and a mechanism for easily solving these matters is demanded. The virtual podcast system provides a mechanism for responding to requests for programming, distribution copyright processing, and monetization by creators while allowing creators to create and distribute podcast programs so that users can view or listen to the podcast programs.

Figure 3:
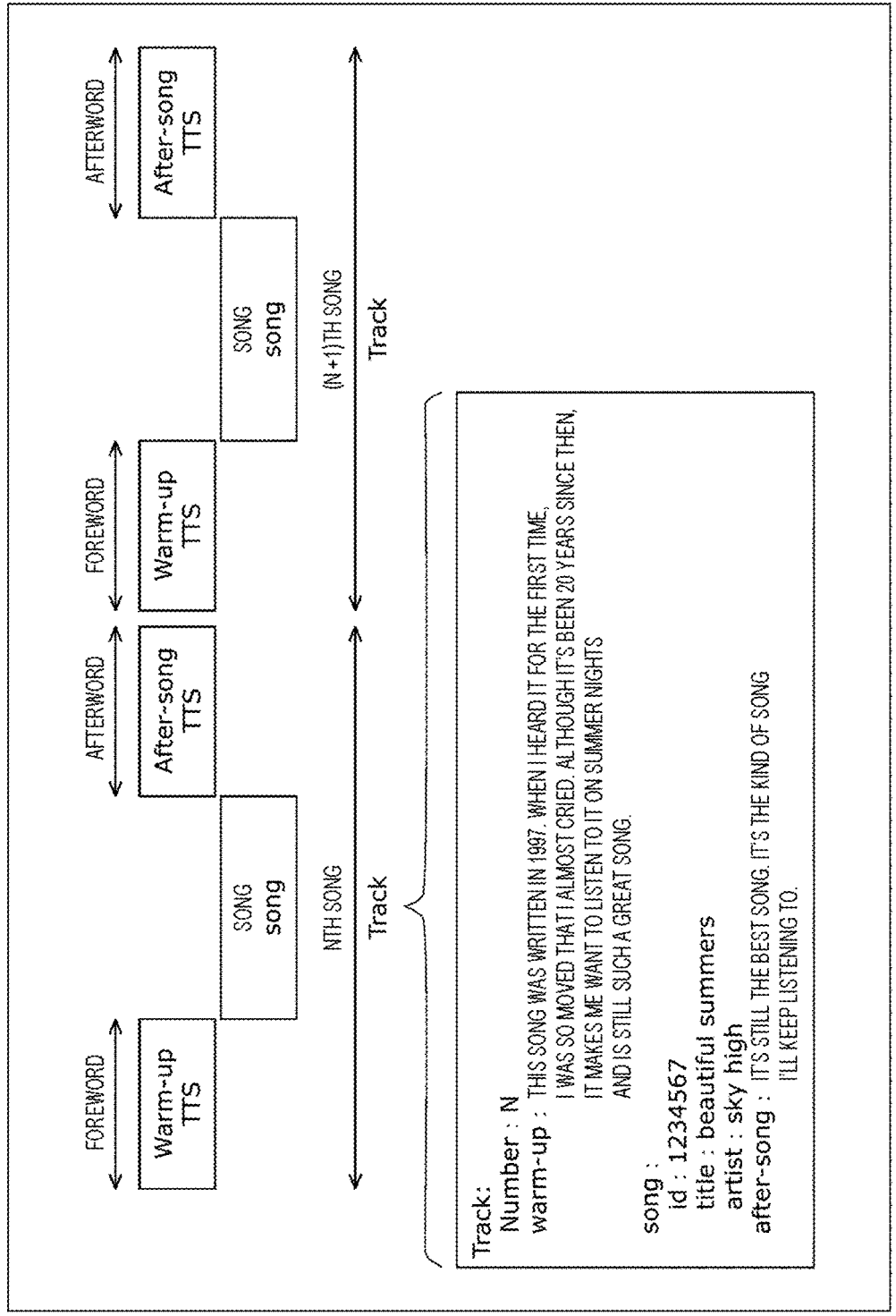
FIG. 3 is a diagram illustrating a flow of content reproduction by the content providing system to which the present technology is applied.

FIG. 3 illustrates a flow of reproduction of a podcast program generated by the virtual podcast system.

FIG. 3 illustrates an Nth track and an (N+1)th track that are temporally continuous among tracks included in the podcast program.

Each track includes a foreword (Warm-up), song (song), and an afterword (After-song).

The foreword introduces the song and includes a text (sentence). In this example, as the foreword, a text "this song was written in . . . , still such a great song!" is described. The text corresponding to this foreword can be converted into a voice by text-to-speech (TTS) and read.

The song includes identification information (id) for identifying the song, and information regarding a title (title) and an artist name (artist) of the song. For example, by using the song ID of "1234567", streaming distribution of the song specified by the song ID can be requested to the music distribution service contracted by the user.

The afterword is a description after the song is listened and includes a text (sentence). In this example, as the afterword, a text "It's still the best song . . . " is described. The text corresponding to this afterword can be read using the TTS.

Here, upon distributing a podcast program, the following two cases are assumed as the right processing for including the song in the program.

Figure 4:
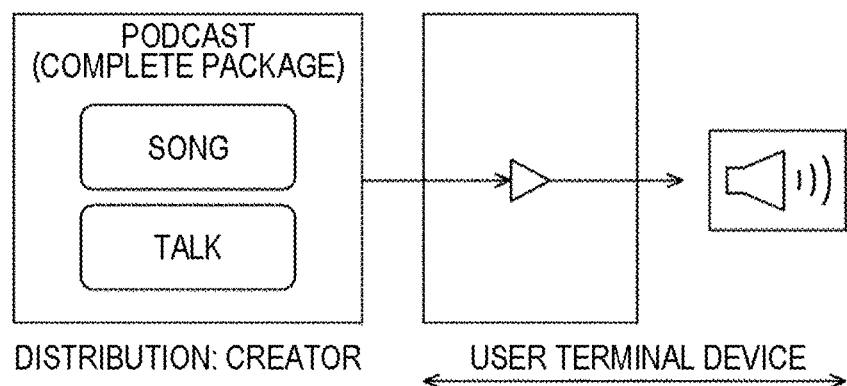
FIG. 4 is a diagram illustrating an example of right processing in a case where distribution including music is performed.

The first is a case where a program including the song is distributed. In this case, as illustrated in FIG. 4, the creator creates a podcast program that is a complete package including a song and talks (foreword and afterword) and the podcast program is distributed, and thus the copyright processing of the song occurs for the creator who distributes the program.

Figure 5:
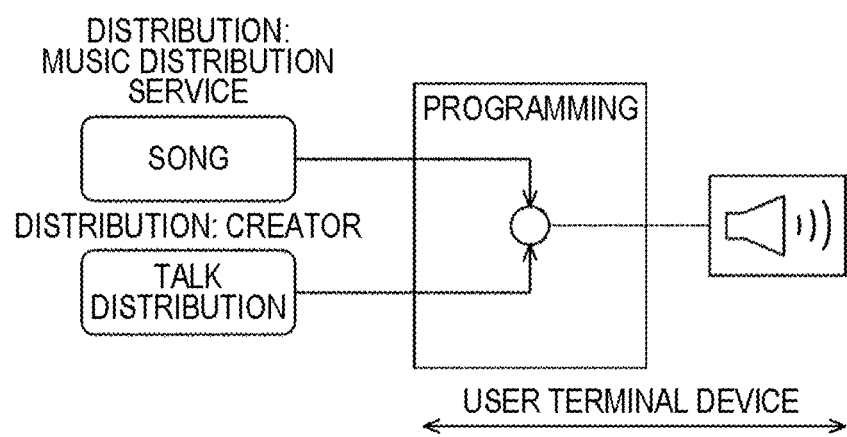
FIG. 5 is a diagram illustrating an example of right processing in a case where VPC type distribution is performed.

The second is a case where a VPC type distribution is performed. In this case, as illustrated in FIG. 5, the song is distributed using the music distribution service, and since the creator only creates and distributes talks (foreword and afterword), the copyright processing of the song does not occur for the creator.

That is, when the creator distributes the podcast program, configuration data, the foreword, and the afterword regarding the configuration of the program are distributed. Thus, since the portion of the song in the program is distributed by the music distribution service, the copyright processing of the song does not occur for the creator.

In the VPC type distribution, since the song that is distributed by streaming by the music distribution service and the talks (foreword and afterword) to be distributed by the creator are synthesized and programmed on the user terminal device used by the user, the right processing of the song portion in the podcast program programmed on the user terminal device side is performed by the user.

As described above, in the VPC type distribution, at the time of distributing the podcast, the creator distributes identification information (song ID) of the song without making a complete podcast program, so that the song that is distributed by streaming by the music distribution service is reproduced on the user terminal device side used by the user on the basis of the song ID.

That is, in the user terminal device, since the song is reproduced using the right that the user has already acquired by a contract with the music distribution service, the copyright processing of the song does not occur to the creator. On the other hand, since the user can also reproduce the song within a normal song distribution range in the music distribution service with which the user has a contract, the user can reproduce the song specified by the song ID instructed by the creator without paying an additional fee in particular.

In the virtual podcast system, the podcast program is distributed by this Virtual Pod Cast (VPC) type distribution.

Note that the user's contract with the music distribution service is not limited to a pay user contract (premium user), and even in a free user contract (free user), in a case where song can be reproduced only by inserting an advertisement, the right can be used.

Figure 6:
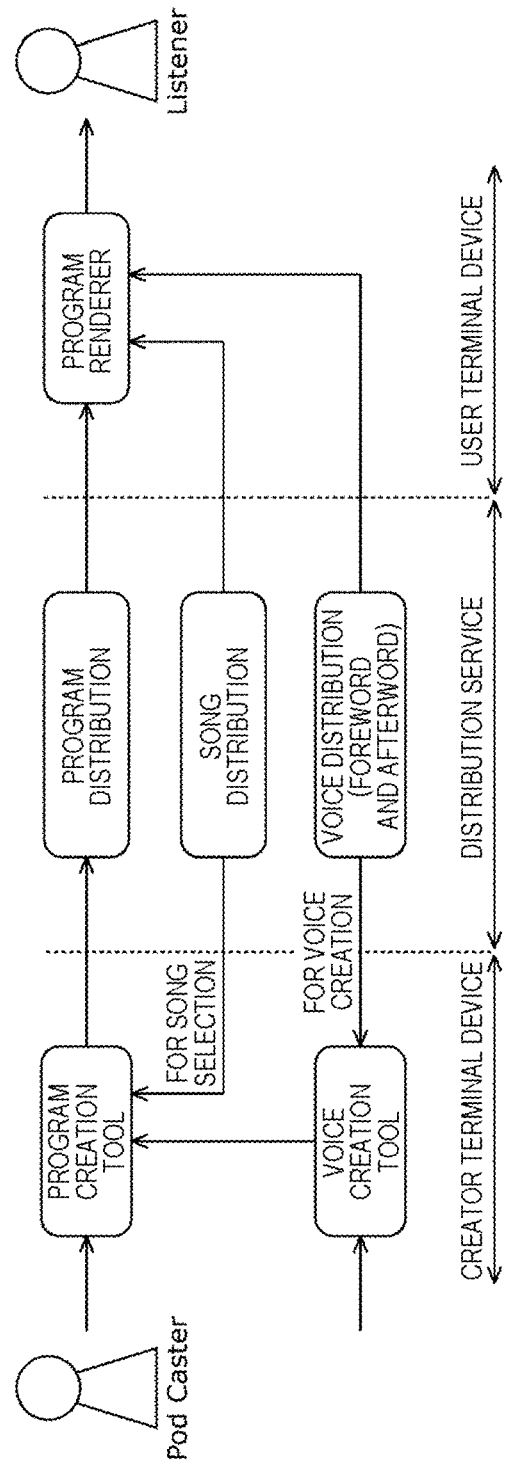
FIG. 6 is a diagram illustrating an example of an overall configuration of the content providing system to which the present technology is applied.

FIG. 6 illustrates an example of an overall configuration of the virtual podcast system.

As illustrated in FIG. 6, functions provided by the virtual podcast system are roughly divided into creator side functions provided by a creator terminal device, various distribution service side functions provided by a distribution server, and user side functions provided by a user terminal device.

In the creator terminal device, a program creation tool and a voice creation tool are executed according to the operation of the creator (PodCaster), and the podcast program is generated.

For example, the program creation tool generates the podcast program on the basis of the song ID of a song selected from a song list (catalog) for song selection provided from a song distribution service, and texts of the foreword and the afterword of the song whose sound at the time of voice synthesis has been adjusted by the voice creation tool, and registers the podcast program in a program distribution service.

The voice creation tool provides a TTS sound adjustment function on the basis of data for voice creation provided from the voice distribution service. By operating the voice creation tool and using the TTS sound adjustment function, the creator can make a TTS voice reproduced on the user side his or her favorite voice.

The program distribution service provides a service for distributing the podcast program registered by the program creation tool to the user terminal device.

The song distribution service corresponds to the music distribution service with which the user who uses the user terminal device has a contract (subscription). The song distribution service distributes the song specified by the song ID set in the podcast program in response to a request from the user terminal device. Furthermore, the song distribution service provides the song list for song selection to the creator terminal device.

The voice distribution service provides a service for distributing, to a user terminal device, a TTS voice obtained by voice synthesis of texts of the foreword and the afterword of the song set in the podcast program. Furthermore, the voice distribution service provides data for voice creation to the creator terminal device.

In the user terminal device, a program renderer is executed according to an operation of a user (listener), and the podcast program is reproduced.

When reproducing a desired program from among podcast programs published by the program distribution service, the program renderer performs rendering of a song distributed from the song distribution service and TTS voice distributed from the voice distribution service on the basis of configuration data (reproduction data) related to the configuration of the program.

Thus, the podcast program is reproduced (recreated) and can be viewed or listened to by the user. Note that the program renderer executed by the user terminal device can also be said to be a reproducing player.

Figure 7:
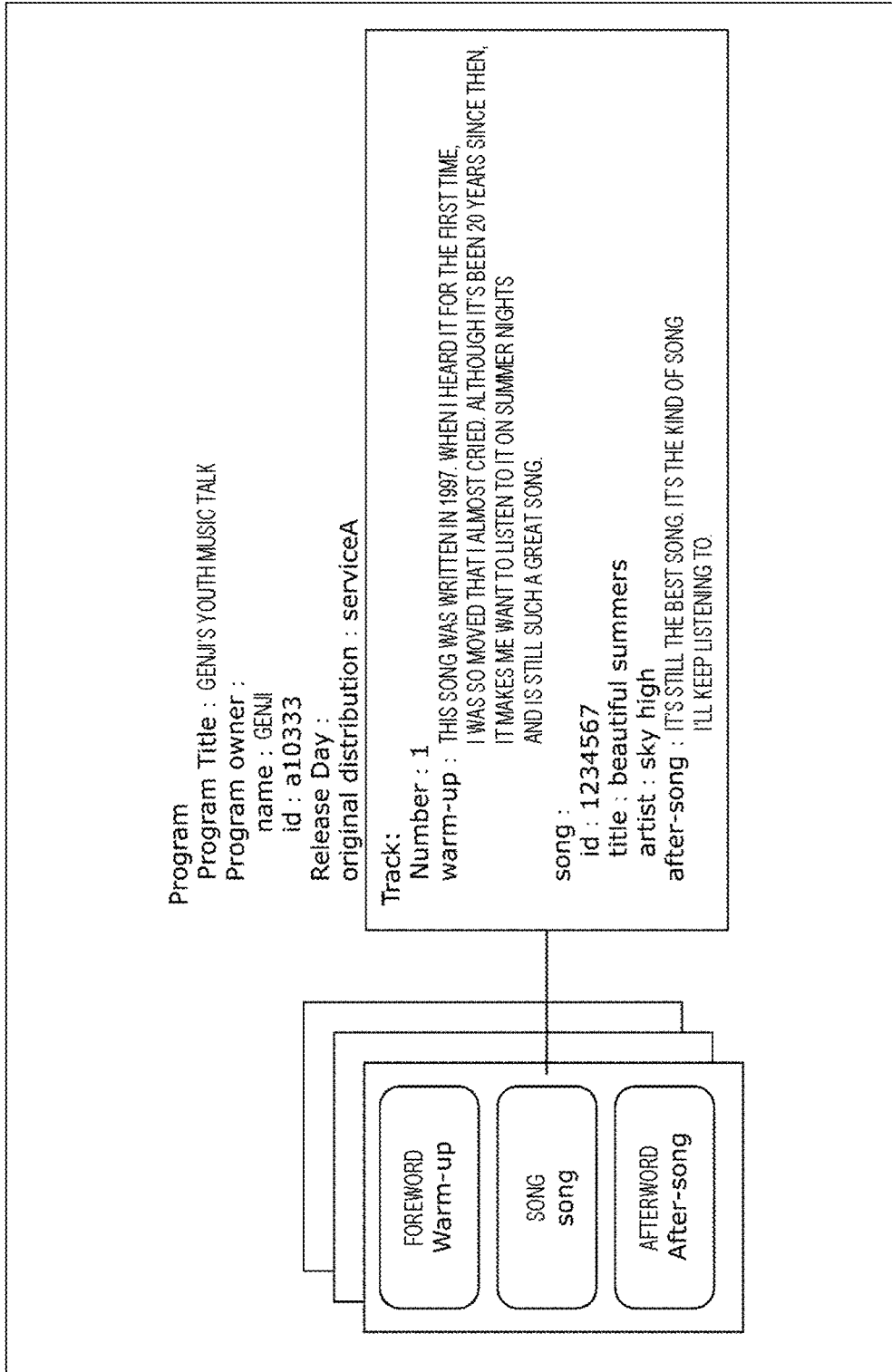
FIG. 7 is a diagram illustrating an example of a script used in the content providing system.

FIG. 7 illustrates an example of a script describing a configuration of the podcast program.

As illustrated in FIG. 7, in the virtual podcast system, a podcast program is configured by setting a plurality of sets of the song ID of a song to be programmed and the foreword and the afterword of the song. This configuration of the podcast program is described by the script illustrated in FIG. 7.

In FIG. 7, in the script, a title and an owner of the program, a release date, a service name serving as a distribution source of the song, and the like are described at the beginning as information regarding the program.

In the script, information regarding the track is described following the information regarding the program. FIG. 7 illustrates an example of description of a first track among the N tracks.

In the track, information regarding the number (Number) of the target track, the foreword (Warm-up), the song (song), and the afterword (After-song) are described.

In the song (song), identification information (id) for identifying the song, and information regarding a title (title) and an artist name (artist) of the song, and the like are described. For example, by describing the song ID "1234567", it is possible to request the music distribution service "serviceA" to distribute the song specified by the song ID.

In the foreword (Warm-up) and the afterword (After-song), comment information corresponding to a comment regarding the song is described. For example, as the foreword, the text "This song was written in ... still such a great song!" is described, and as the afterword, the text "It's still the best song ... " is described, thereby enabling these texts to be converted into voice and read aloud using the TTS service.

In FIG. 7, only the first track is described, that is, a description example of information related to the song of the first song is illustrated. However, for the second and subsequent songs, similarly to the song of the first song, the song ID, the foreword, and the afterword are described as a set for each song.

In this way, the script including the song ID of the song and the foreword and the afterword related to the song is generated by the creator terminal device used by the creator and registered in the program distribution service, thereby being published to the user.

On the other hand, in the user terminal device used by the user, according to the script published by the program distribution service, control is performed so that the song indicated by the song ID is distributed by streaming using the right that the user has already acquired by the contract with the music distribution service, and control is performed so that the TTS voice of the foreword and the afterword is provided.

In other words, the script merely describes the song ID of the song and the foreword and the afterword in text but does not include the data itself of the song or the voice reproduced in the podcast program, but in the user terminal device, data of the song or the voice is reproduced on the basis of the song ID described in the script and the information indicated by the foreword and the afterword, to thereby recreate the program created by the creator.

Furthermore, it is possible to program an already existing playlist by generating a script to which the foreword and the afterword are added with respect to (the song ID of) a song in the playlist, and thus the user can easily program the playlist only by inputting the foreword and the afterword of the song.

(Configuration of System)

Figure 8:
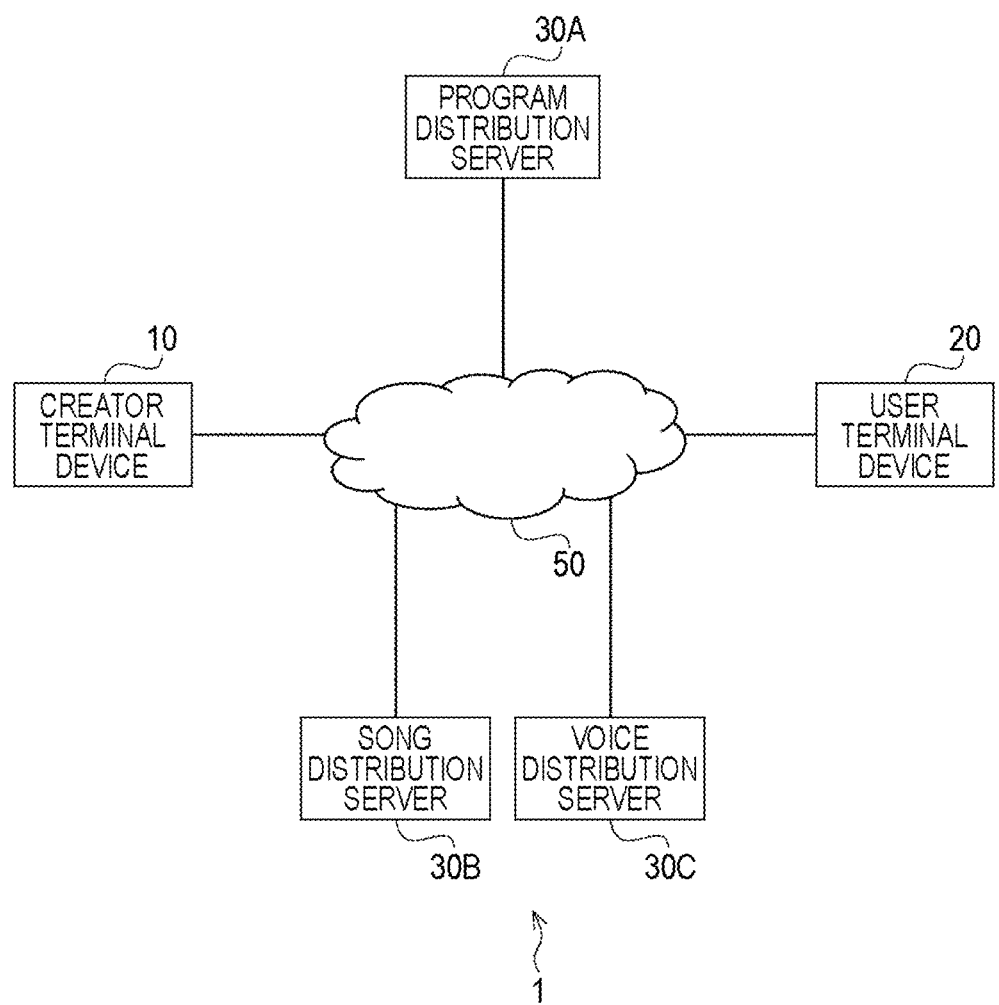
FIG. 8 is a diagram illustrating an example of a configuration of an embodiment of the content providing system to which the present technology is applied.

FIG. 8 illustrates a configuration of the virtual podcast system as an example of a configuration of the embodiment of the content providing system to which the present technology is applied. Note that this content providing system can also be said to be an information processing system including a plurality of information processing devices.

In FIG. 8, a content providing system 1 includes a creator terminal device 10, a user terminal device 20, a program distribution server 30A, a song distribution server 30B, and a voice distribution server 30C.

In the content providing system 1, the creator terminal device 10, the user terminal device 20, the program distribution server 30A, the song distribution server 30B, and the voice distribution server 30C are mutually connected via a network 50.

The creator terminal device 10 is a device such as a smartphone, a tablet terminal, or a personal computer, and is used by the creator.

The creator terminal device 10 generates the script of the podcast program in accordance with the creator's operation, and transmits (uploads) the script of the podcast program to the program distribution server 30A via the network 50.

The user terminal device 20 is a device such as a smartphone, a tablet terminal, a music player, a game device, or a personal computer, and is used by a user.

The user terminal device 20 accesses the program distribution server 30A via the network 50 according to an operation by the user, and receives (downloads) the script of the podcast program.

The program distribution server 30A includes one or a plurality of servers that provides the program distribution service. The program distribution service is a service for distributing podcast programs, and is provided by a program distributor.

The program distribution server 30A receives the script of the program transmitted (uploaded) from the creator terminal device 10 via the network 50, and registers the script in the storage medium to be browsable by the user using the user terminal device 20.

In a case where the program distribution server 30A receives a reproduction request for the program transmitted from the user terminal device 20 via the network 50, the program distribution server 30A reads the script of the program from the storage medium and distributes the script to the user terminal device 20 that is the reproduction request source.

The song distribution server 30B includes one or a plurality of servers that provides the music distribution service. The music distribution service is a service for distributing songs through the Internet, and is provided by a music distributor. For example, the music distribution service is provided in an unlimited-listening format of a flat-rate streaming.

In a case where a distribution request for a song transmitted from the user terminal device 20 via the network 50 is received, the song distribution server 30B specifies the song corresponding to the received distribution request and distributes streaming data of the song to the user terminal device 20 that is the distribution request source.

The voice distribution server 30C includes one or a plurality of servers that provides the voice distribution service. The voice distribution service is a service for distributing voice such as TTS voice or raw voice through the Internet, and is provided by a voice distributor.

In a case where the voice distribution server 30C receives the distribution request of the voice transmitted from the user terminal device 20 via the network 50, the voice distribution server 30C acquires the voice corresponding to the received distribution request, and distributes data of the voice to the user terminal device 20 as the distribution request source.

Note that, in the following description, the program distribution server 30A, the song distribution server 30B, and the voice distribution server 30C will be referred to as the distribution server 30 in a case where it is not particularly necessary to distinguish them. Furthermore, the program distributor, the music distributor, and the voice distributor may be the same business or different businesses.

The network 50 includes a communication network such as the Internet, an intranet, or a mobile phone network, and enables interconnection between devices using a communication protocol such as Transmission Control Protocol/Internet Protocol (TCP/IP).

(Configuration of Creator Terminal Device)

Figure 9:
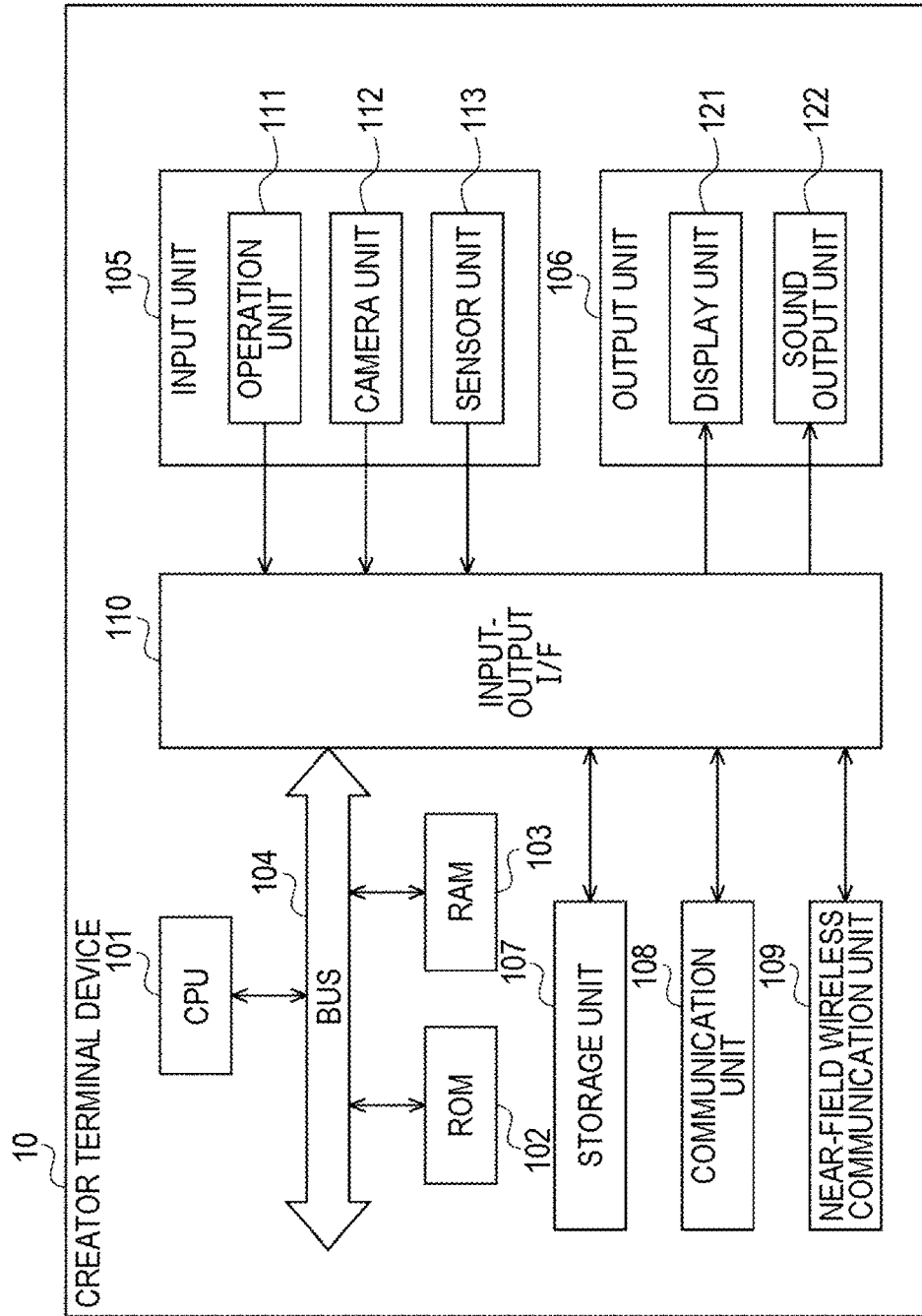
FIG. 9 is a diagram illustrating an example of a configuration of a creator terminal device.

FIG. 9 illustrates an example of a configuration of the creator terminal device 10 of FIG. 8.

As illustrated in FIG. 9, in the creator terminal device 10, a central processing unit (CPU) 101, a read only memory (ROM) 102, and a random access memory (RAM) 103 are mutually connected by a bus 104.

The CPU 101 controls the operation of each unit of the creator terminal device 10 by executing a program recorded in the ROM 102 or a storage unit 107. Various data are appropriately stored in the RAM 103.

An input-output I/F 110 is also connected to the bus 104. An input unit 105, an output unit 106, a storage unit 107, a communication unit 108, and a near-field wireless communication unit 109 are connected to the input-output I/F 110.

The input unit 105 supplies various input data to each unit including the CPU 101 via the input-output I/F 110. For example, the input unit 105 includes an operation unit 111, a camera unit 112, and a sensor unit 113.

The operation unit 111 is operated by the creator and supplies operation data corresponding to the operation to the CPU 101. The operation unit 111 includes a physical button, a touch panel, and the like.

The camera unit 112 photoelectrically converts light from a subject incident thereon, and performs signal processing on an electric signal obtained as a result, thereby generating and outputting captured image data. The camera unit 112 includes an image sensor, a signal processing unit, and the like.

The sensor unit 113 performs sensing of space information, time information, and the like, and outputs sensor data obtained as a result of the sensing.

The sensor unit 113 includes an acceleration sensor, a gyro sensor, and the like. The acceleration sensor measures accelerations in three directions of XYZ axes. The gyro sensor measures angular velocities of three axes of the XYZ axes. Note that an inertial measurement unit (IMU) may be provided to measure three-dimensional acceleration and angular velocity with an accelerometer in three directions and a gyroscope with three axes.

Furthermore, the sensor unit 113 can include various sensors such as a sound sensor (microphone) that detects a sound such as the creator's voice, a biological sensor that measures information such as a heart rate, a body temperature, or a posture of a living being, a proximity sensor that measures a nearby object, and a magnetic sensor that measures a magnitude and a direction of a magnetic field.

The output unit 106 outputs various types of information under the control of the CPU 101 via the input-output I/F 110. For example, the output unit 106 includes a display unit 121 and a sound output unit 122.

The display unit 121 displays an image or the like corresponding to image data under the control of the CPU 101. The display unit 121 includes a panel unit such as a liquid crystal panel or an organic light emitting diode (OLED) panel, a signal processing unit, and the like.

The sound output unit 122 outputs a sound corresponding to the sound data under the control of the CPU 101. The sound output unit 122 includes a speaker, a headphone connected to an output terminal, and the like.

The storage unit 107 records various data and programs under the control of the CPU 101. The CPU 101 reads and processes various data from the storage unit 107, and executes a program.

The storage unit 107 is configured as an auxiliary storage device such as a semiconductor memory. The storage unit 107 may be configured as an internal storage or may be an external storage such as a memory card.

The communication unit 108 communicates with other devices via the network 50 under the control of the CPU 101. The communication unit 108 is configured as a communication module compatible with cellular communication (for example, LTE-Advanced, 5G, or the like), wireless communication such as a wireless local area network (LAN), or wired communication.

The near-field wireless communication unit 109 performs wireless communication according to a near-field wireless communication standard such as Bluetooth (registered trademark) or near field communication (NFC), and exchanges various data.

Note that the configuration of the creator terminal device 10 illustrated in FIG. 9 is an example, and for example, a microphone may be provided as an input unit, or an image processing circuit such as a graphics processing unit (GPU), a power supply circuit, or the like may be provided.

Figure 10:
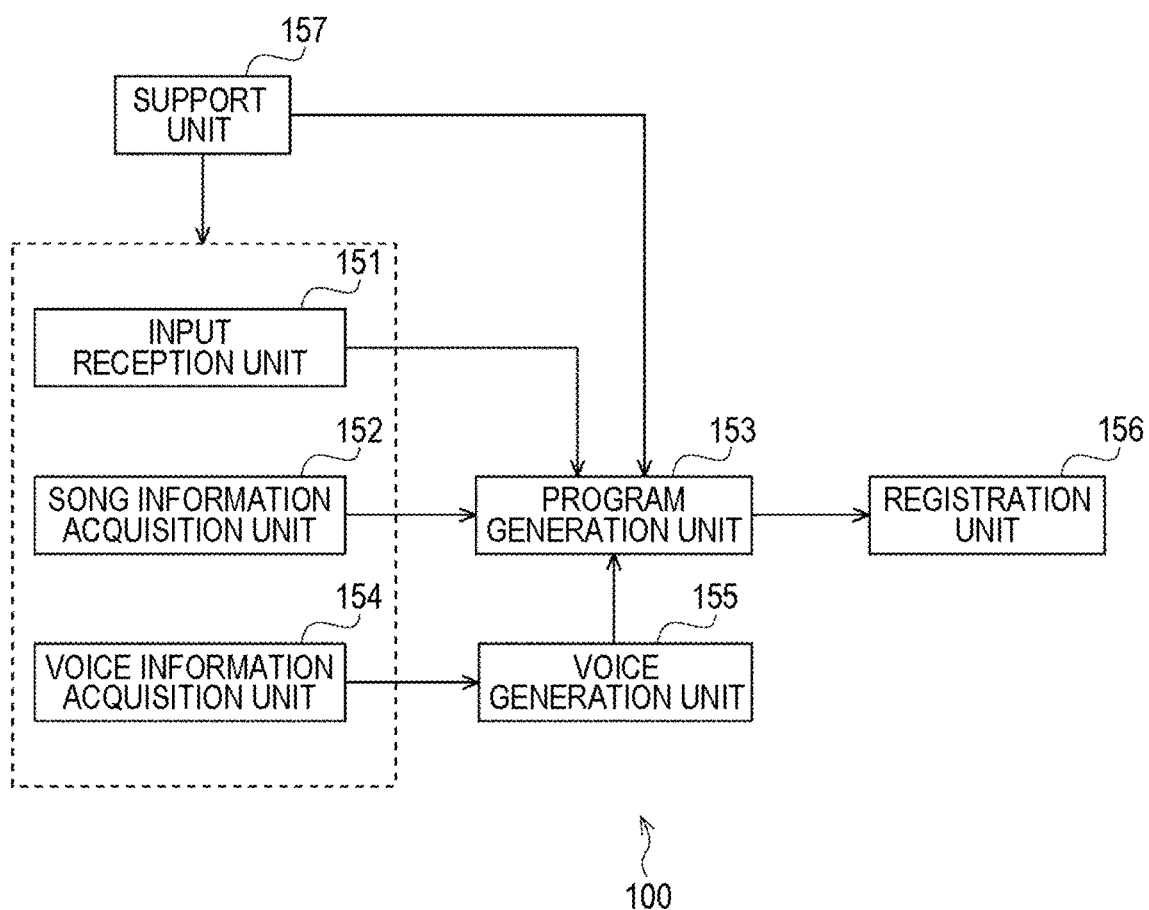
FIG. 10 is a diagram illustrating an example of a functional configuration of a control unit in the creator terminal device.

FIG. 10 illustrates an example of a functional configuration of a control unit 100 in the creator terminal device 10. The function of the control unit 100 is implemented by the CPU 101 executing a program such as the program creation tool or the voice creation tool.

In FIG. 10, the control unit 100 includes an input reception unit 151, a song information acquisition unit 152, a program generation unit 153, a voice information acquisition unit 154, a voice generation unit 155, a registration unit 156, and a support unit 157.

The input reception unit 151 receives operation data corresponding to the operation of the creator supplied from the input unit 105, and supplies the operation data to the program generation unit 153.

The song information acquisition unit 152 acquires song information regarding a song supplied from the communication unit 108 that communicates with the song distribution server 30B, and supplies the song information to the program generation unit 153. The song information includes information such as a song list and a song ID received from the song distribution server 30B.

On the basis of the operation data supplied from the input reception unit 151, the program generation unit 153 processes the song information supplied from the song information acquisition unit 152 and the comment information regarding the foreword and the afterword, thereby generating the script of the podcast program and supplying the script to the registration unit 156.

The voice information acquisition unit 154 acquires voice information regarding the voices of the foreword and the afterword supplied from the communication unit 108 that communicates with the voice distribution server 30C, and supplies the voice information to the voice generation unit 155. The voice information includes information such as information regarding a voice at the time of voice synthesis or voice creation received from the voice distribution server 30C.

The voice generation unit 155 processes the voice information supplied from the voice information acquisition unit 154 to generate a voice for the creator to set the foreword and the afterword, and supplies the voice to the program generation unit 153.

Upon generating the podcast program, the program generation unit 153 uses the voice supplied from the voice generation unit 155 to provide the creator with information (voice or the like at the time of voice synthesis) regarding the setting of the foreword and the afterword, thereby generating a script of the program and supplying the script to the registration unit 156.

The registration unit 156 controls the communication unit 108 to upload and register the script of the program supplied from the program generation unit 153 to the program distribution server 30A via the network 50.

The support unit 157 operates in cooperation with the input reception unit 151, the song information acquisition unit 152, the program generation unit 153, and the voice information acquisition unit 154, thereby supporting the creation of a script by the creator.

(Configuration of Distribution Server)

Figure 11:
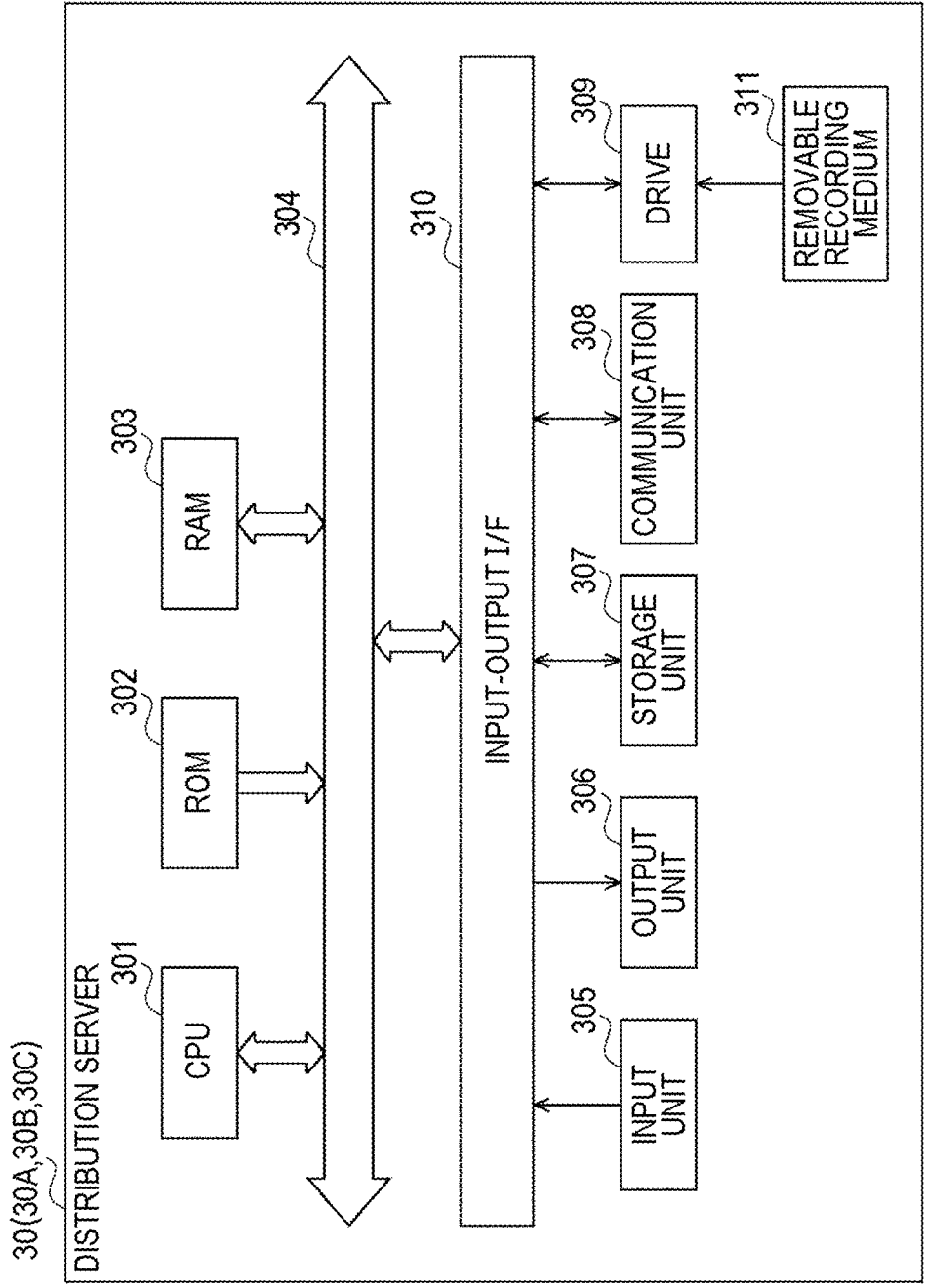
FIG. 11 is a diagram illustrating an example of a configuration of a distribution server.

FIG. 11 illustrates an example of a configuration of the distribution server 30 of FIG. 8. Note that the distribution server 30 corresponds to any server of the program distribution server 30A, the song distribution server 30B, and the voice distribution server 30C illustrated in FIG. 8.

In the distribution server 30, a CPU 301, a ROM 302, and a RAM 303 are mutually connected by a bus 304. An input-output I/F 310 is further connected to the bus 304. An input unit 305, an output unit 306, a storage unit 307, a communication unit 308, and a drive 309 are connected to the input-output I/F 310.

The input unit 305 includes a microphone, a keyboard, a mouse, and the like. The output unit 306 includes a speaker, a display, and the like.

The storage unit 307 includes a hard disk drive (HDD), a semiconductor memory, and the like. The communication unit 308 is configured as a communication module compatible with wireless communication such as a wireless LAN or wired communication such as Ethernet (registered trademark).

The drive 309 drives a removable recording medium 311 such as a magnetic disk, an optical disk, a magneto-optical disk, or a semiconductor memory.

Figure 12:
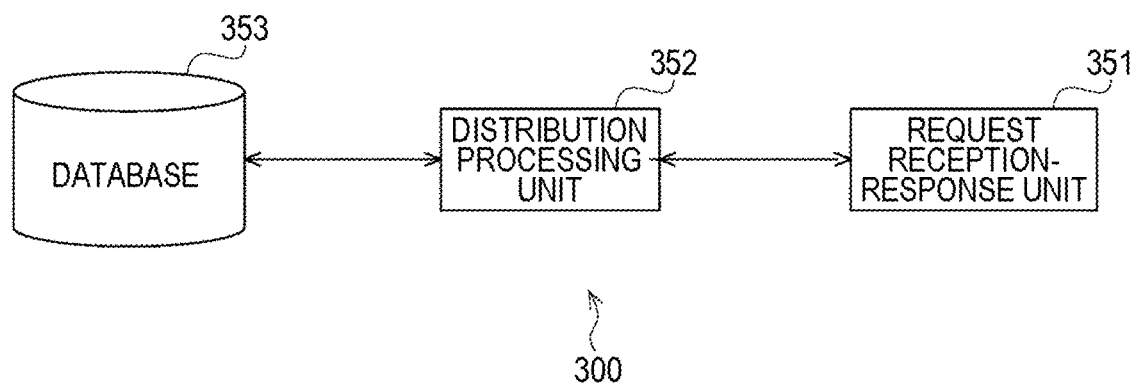
FIG. 12 is a diagram illustrating an example of a functional configuration of a control unit in the distribution server.

FIG. 12 illustrates an example of a functional configuration of a control unit 300 in the distribution server 30. The function of the control unit 300 is implemented by the CPU 301 executing a program of each service.

In FIG. 12, the control unit 300 includes a request reception-response unit 351, a distribution processing unit 352, and a database 353.

The request reception-response unit 351 receives various requests supplied from the communication unit 308 that communicates with the creator terminal device 10 or the user terminal device 20, and supplies the requests to the distribution processing unit 352.

The distribution processing unit 352 performs distribution processing according to various requests supplied from the request reception-response unit 351.

The database 353 is recorded in the storage unit 307 including a large-capacity storage such as an HDD or a semiconductor memory.

For example, the script of the podcast program or the like is stored in the database 353 of the program distribution server 30A. Furthermore, in the database 353 of the song distribution server 30B, a song provided by the music distribution service is stored in association with the song ID. Moreover, the database 353 of the voice distribution server 30C stores information regarding the voice at the time of voice synthesis or voice creation, voice data of the foreword or the afterword, and the like.

When performing the distribution processing, the distribution processing unit 352 processes various data stored in the database 353, generates responses according to various requests, and supplies the responses to the request reception-response unit 351.

The request reception-response unit 351 controls the communication unit 308 to transmit a response according to various requests supplied from the distribution processing unit 352 to the creator terminal device 10 or the user terminal device 20 as a request source via the network 50.

Next, a flow of processing executed in each device of the content providing system 1 will be described.

(Overall Processing Flow)

Figure 13:
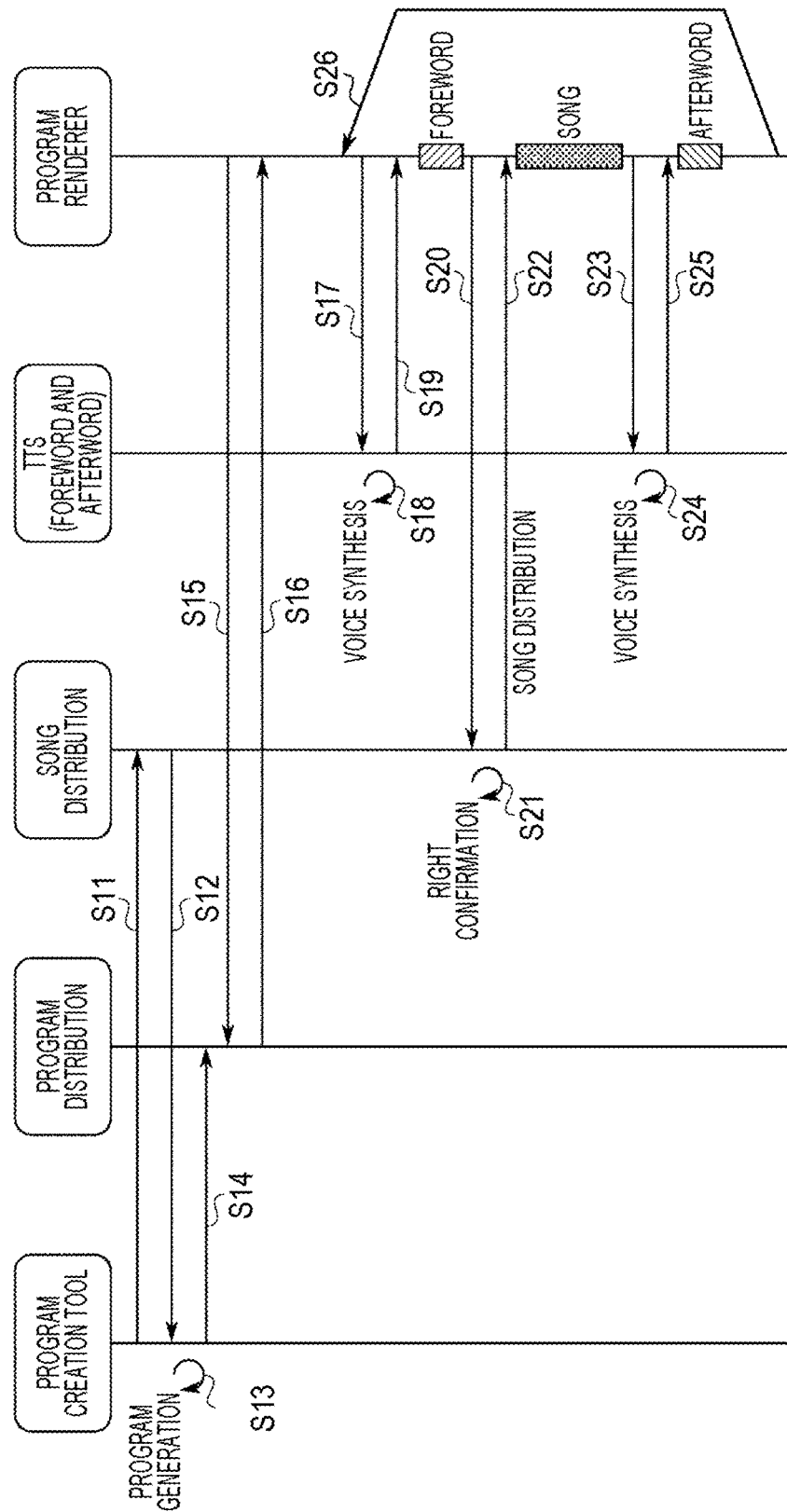
FIG. 13 is a sequence diagram illustrating an overall processing flow of the content providing system.

FIG. 13 is a sequence diagram illustrating an overall processing flow of the content providing system 1.

In FIG. 13, the program creation tool is executed by the creator terminal device 10, and the program renderer is executed by the user terminal device 20. Furthermore, in FIG. 13, the program distribution service is provided by the program distribution server 30A, the music distribution service is provided by the song distribution server 30B, and the TTS service is provided by the voice distribution server 30C.

In the creator terminal device 10, a program creation tool is executed by the control unit 100, and the processing of steps S11 to S14 is executed.

The program creation tool requests the song distribution server 30B for the song list, thereby acquiring the song list transmitted from the song distribution server 30B and presenting the song list to the creator (S11 and S12).

The program creation tool generates a script of a podcast program on the basis of the song ID of the song selected from the song list by the creator and texts of the foreword and the afterword of the song input by the creator (S13), and registers the script in the program distribution server 30A (S14).

Thus, in the program distribution server 30A, the script of the podcast program created by the creator is stored in the database 353, and can be browsed by the user using the user terminal device 20.

In the user terminal device 20, the program renderer is executed by the control unit 200, and the program renderer operates in cooperation with each distribution server 30, so that the processing of steps S15 to S26 is executed.

In the program renderer, in a case where an instruction to reproduce a podcast program published to be browsable on the program distribution server 30A is given by the user's operation, the script of the program distributed from the program distribution server 30A is received (S15 and S16).

The program renderer requests the voice distribution server 30C to perform voice synthesis of the text of the foreword on the basis of the foreword set to the beginning of the received script (S17).

In the voice distribution server 30C, voice synthesis of the text of the foreword is performed in response to the request from the program renderer (S18), and a result of the voice synthesis is distributed (S19).

Thus, in the program renderer, the result of the voice synthesis distributed from the voice distribution server 30C is received and the rendering processing is performed, so that the TTS voice of the foreword portion set in the programmed song is reproduced.

Next, on the basis of the song ID set next to the foreword of the received script, the program renderer requests the song distribution server 30B that provides the music distribution service contracted by the user to distribute the song specified by the song ID (S20).

In the song distribution server 30B, in response to the request from the program renderer, the right acquired by the contract with the music distribution service by the user is confirmed (S21), and in a case where it is determined that the user has a legitimate right and reproduction of the song specified by the song ID is possible, streaming distribution of the song is performed (S22).

Thus, in the program renderer, the streaming data of the song distributed from the song distribution server 30B is received and the rendering processing is performed, so that the song specified by the song ID is reproduced as the programmed song.

Thereafter, when the reproduction of the song that is distributed by streaming is completed, the program renderer requests the voice distribution server 30C to perform voice synthesis of the text of the afterword on the basis of the afterword set next to the song ID of the received script (S23).

In the voice distribution server 30C, the voice synthesis of the text of the afterword is performed in response to the request from the program renderer (S24), and a result of the voice synthesis is distributed (S25).

Thus, in the program renderer, the result of the voice synthesis distributed from the voice distribution server 30C is received and the rendering processing is performed, so that the TTS voice of the afterword portion set in the programmed song is reproduced.

Furthermore, in the script of the podcast program, since the song ID of each of a plurality of songs is programmed together with the texts of the foreword and the afterword of the song, after the processing of steps S17 to S25 is completed, the processing returns to the processing of step S17 (S26), and the processing of steps S17 to S26 is repeated according to the number of song IDs.

Thus, in the program renderer, reproduction is repeatedly performed in the order of the foreword, the song, and the afterword for each song ID set in the script of the program, and the podcast program can be viewed or listened to by the user.

The overall processing flow has been described above.

(Flow of Support Processing of Creator)

Figure 14:
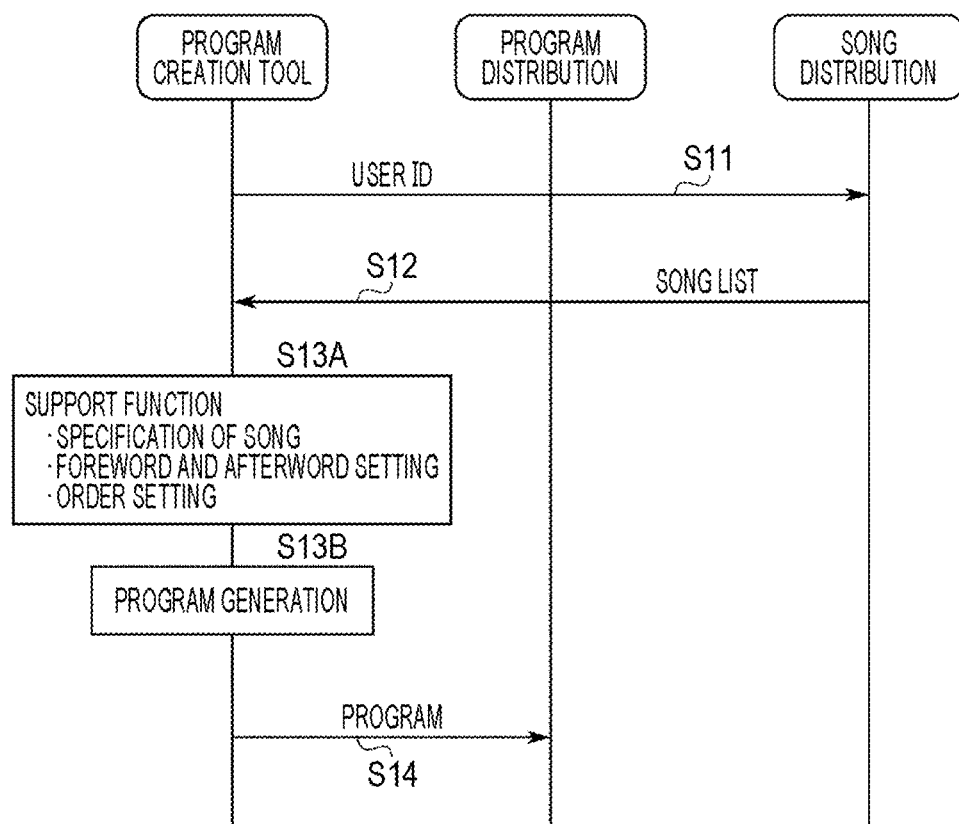
FIG. 14 is a sequence diagram illustrating a flow of processing in a case of supporting generation of a script at time of creating a program by a creator.

FIG. 14 is a sequence diagram illustrating a flow of processing in a case of supporting generation of the script at the time of creating the program by the creator.

In steps S11 to S14 of FIG. 14, as described in steps S11 to S14 of FIG. 13, the script of the podcast program is generated by the program creation tool and registered in the program distribution server 30A.

At this time, in the sequence diagram of FIG. 14, when the script of the podcast program is generated, processing for supporting the generation of the script is performed (S13A).

That is, the program creation tool receives the song list from the song distribution server 10B by transmitting information such as the user ID of the creator registered in the music distribution service to the song distribution server 10B that provides the music distribution service contracted by the creator (S11 and S12).

Thus, in the creator terminal device 10, when the creator creates the podcast program, the song list is presented by the program creation tool, and specification of the song to be included in the program is supported (S13A).

Although details will be described later, when the creator creates the podcast program, that is, generates the script of the program, support is not limited to specific support of songs, and support is also provided for setting of the foreword and the afterword, setting of order of songs, and the like.

In response to the operation of the creator who has received such support, the script of the podcast program is generated (S13B) and registered in the program distribution server 30A (S14).

Thereafter, as described with reference to the sequence diagram in FIG. 13, the podcast program is reproduced by the program renderer (S15 to S26).

In other words, in the program renderer, when an instruction to reproduce the podcast program published on the program distribution server 30A is given, the song distribution server 30B and the voice distribution server 30C are accessed on the basis of the script of the program, so that reproduction is repeated in the order of the foreword, the song, and the afterword for each song specified by the song ID.

The flow of processing in the case of supporting generation of the script at the time of creating the program by the creator has been described above.

(Overall Image of Processing)

Figure 15:
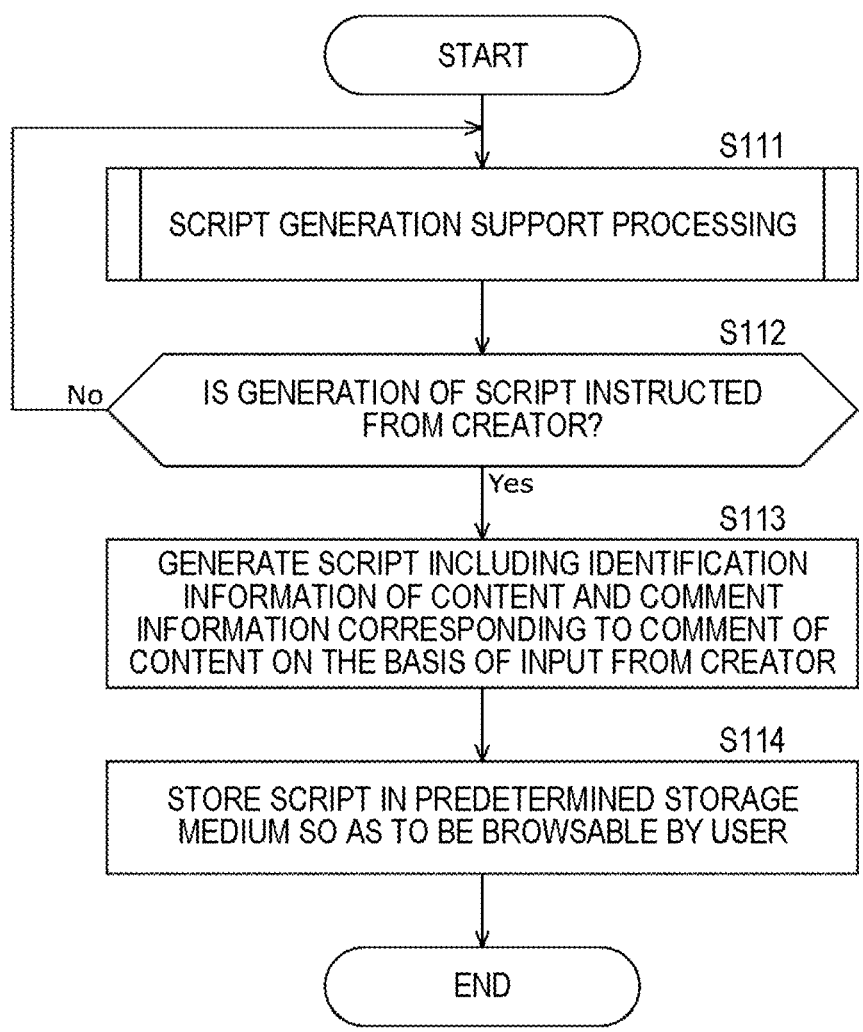
FIG. 15 is a flowchart describing an overall image of processing in a first embodiment.
Figure 16:
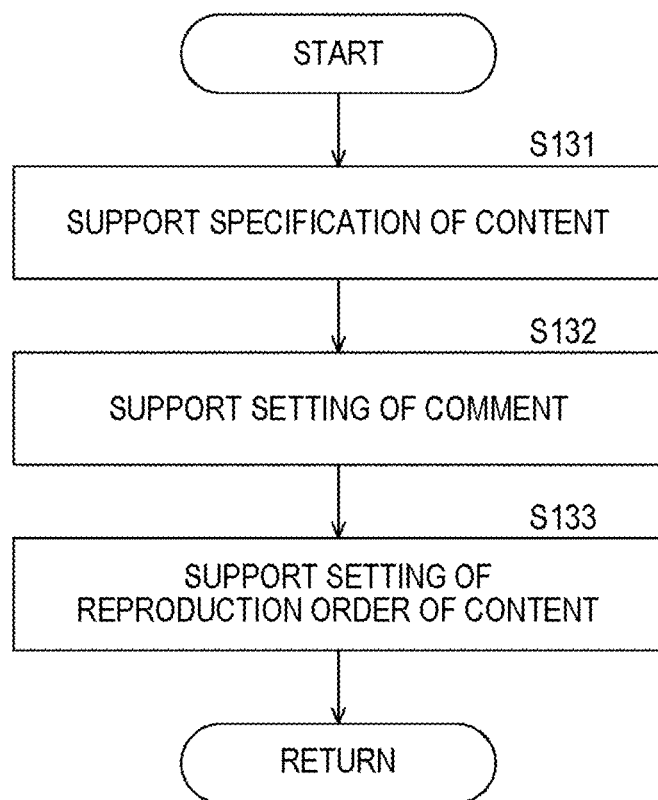
FIG. 16 is a flowchart describing an overall image of processing in the first embodiment.

FIGS. 15 and 16 are flowcharts describing an overall image of processing in the first embodiment.

The processing illustrated in FIGS. 15 and 16 is implemented by (the control unit 100 of) the creator terminal device 10 and (the control unit 300 of) the distribution server 30 in the content providing system to which the present technology is applied operating in cooperation.

That is, this processing is executed by at least one of the control unit 100 or the control unit 300.

In the content providing system 1, as illustrated in FIG. 15, script generation support processing is executed when generating a script in accordance with an input from the creator using the creator terminal device (S111).

In the script generation support processing, as illustrated in FIG. 16, specification of the content (S131), setting of the comment (S132), setting of the reproduction order of the content (S133), and the like are supported.

Here, the content includes a song or the like distributed by the music distribution service. The comment is, for example, the foreword and the afterword set in the song, and at least one of the foreword or the afterword is only required to be set. For example, in programming the song, in addition to inserting the foreword or the afterword in units of songs, a narration or the like may be inserted as the foreword and then three songs may be continuously reproduced, or an impression or the like of the song may be inserted as the afterword after four songs are reproduced continuously.

Returning to the description of FIG. 15, in a case where generation of the script is instructed from the creator ("Yes" in S112), a script including identification information of content and comment information corresponding to the comment of the content is generated on the basis of the input (S113), and the script is stored in a predetermined storage medium to be browsable by the user using the user terminal device 20 (S114).

Here, the content identification information includes a song ID or the like that can identify a song distributed by the music distribution service. The comment information includes text indicating the comment, link information to a raw voice of the creator or the like, or the like. Note that the description will be given assuming that the comment information corresponds to the comment related to the content, but the comment information is not necessarily related to the content, and may correspond to the comment not related to the content. Furthermore, the predetermined storage medium can be, for example, (the database 353 of) the storage unit 307 of the program distribution server 30A.

As described above, when the content is programmed, it is possible to generate the script more easily by performing support for providing content and a comment regarding the content or the like.

For example, in a case where the creator programs songs, even if it is possible to select the program, the foreword, and the afterword for first two or three, it is assumed that it is not possible to think of for more than that. Alternatively, even if it is easy for the creator to select a favorite genre and songs, it is assumed that the creator worries about the order of reproduction of the songs.

On the other hand, the present technology provides a tool that supports the creator to easily select favorite songs and determine the reproduction order of the songs when creating the podcast program using the program creation tool.

2. Second Embodiment

As a supporting method when a creator creates a podcast program, there is a method of presenting a song candidate list on the screen of the program creation tool.

The song presented in the song candidate list can be at least a song that the creator (user) has listened to.

For example, a song of an artist the creator himself or herself likes, a song of which the reproduction frequency by himself or herself is high, a song to which the creator himself or herself has given high evaluation (for example, "Like") in the past, a song shared with other users, and a song specified by a music recognition app can be included in the song candidate list. Conversely, a song of an artist the creator himself or herself dislikes, a song of which the reproduction frequency by himself or herself in a predetermined period is low, and a song to which the creator himself or herself has given a low evaluation (for example, "Dislike") in the past do not have to be included in the song candidate list.

Furthermore, a song of an artist that the creator has been to a concert, a purchase history at ticket agency, or the like may be referred to, or a song that has been listened to in the same period as when a song is already a candidate may be included.

(Flow of Song Candidate List Presentation Processing)

Figure 17:
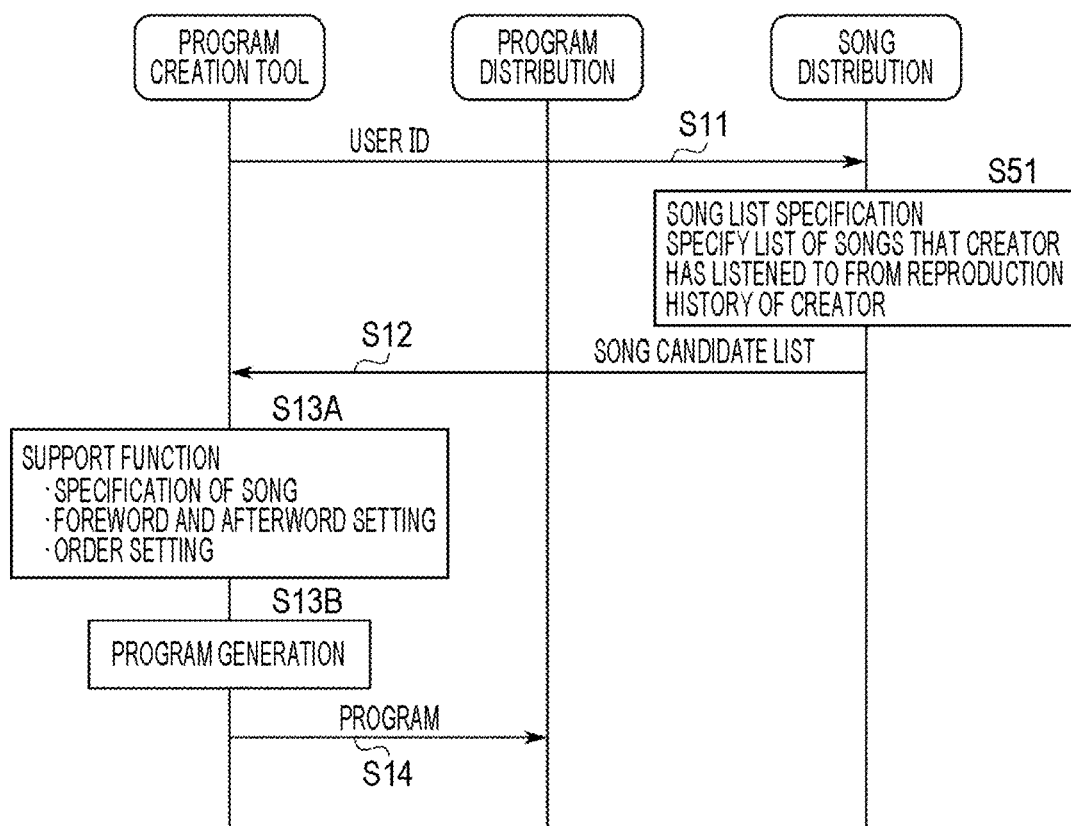
FIG. 17 is a sequence diagram illustrating a flow of processing in a case of presenting a song that has been listened to by the creator at time of creating the program.

FIG. 17 is a sequence diagram illustrating a flow of processing in a case of presenting a song that has been listened to by the creator at the time of creating the program.

In steps S11 to S14 of FIG. 17, as described in steps S11 to S14 of FIG. 13, the script of the podcast program is generated by the program creation tool and registered in the program distribution server 30A.

At this time, the song distribution server 30B specifies a list to be candidates of songs that the creator has listened to from a reproduction history of songs of the creator in the music distribution service on the basis of the user ID of the creator, and provides the list as a song candidate list to the program creation tool (S51).

For example, the reproduction history of songs can include songs of which the reproduction frequency by the creator himself or herself is high, songs highly evaluated by the creator in the past (for example, a song to which "Like" is given), songs shared by the creator with other users, songs specified by an application (music recognition app) capable of recognizing a song reproduced around the creator, and the like.

Furthermore, when the song candidate is specified, a song of an artist that the creator has been to a concert in the past, a purchase history at ticket agency, or the like may be referred to. Alternatively, a song that the creator has listened to in the same period as when a song is already a candidate for the song may be included.

Thus, in the program creation tool, when the creator creates the podcast program, the song candidate list provided from the song distribution server 30B is presented, and specification of the song to be included in the program is supported (S13A).

Figure 18:
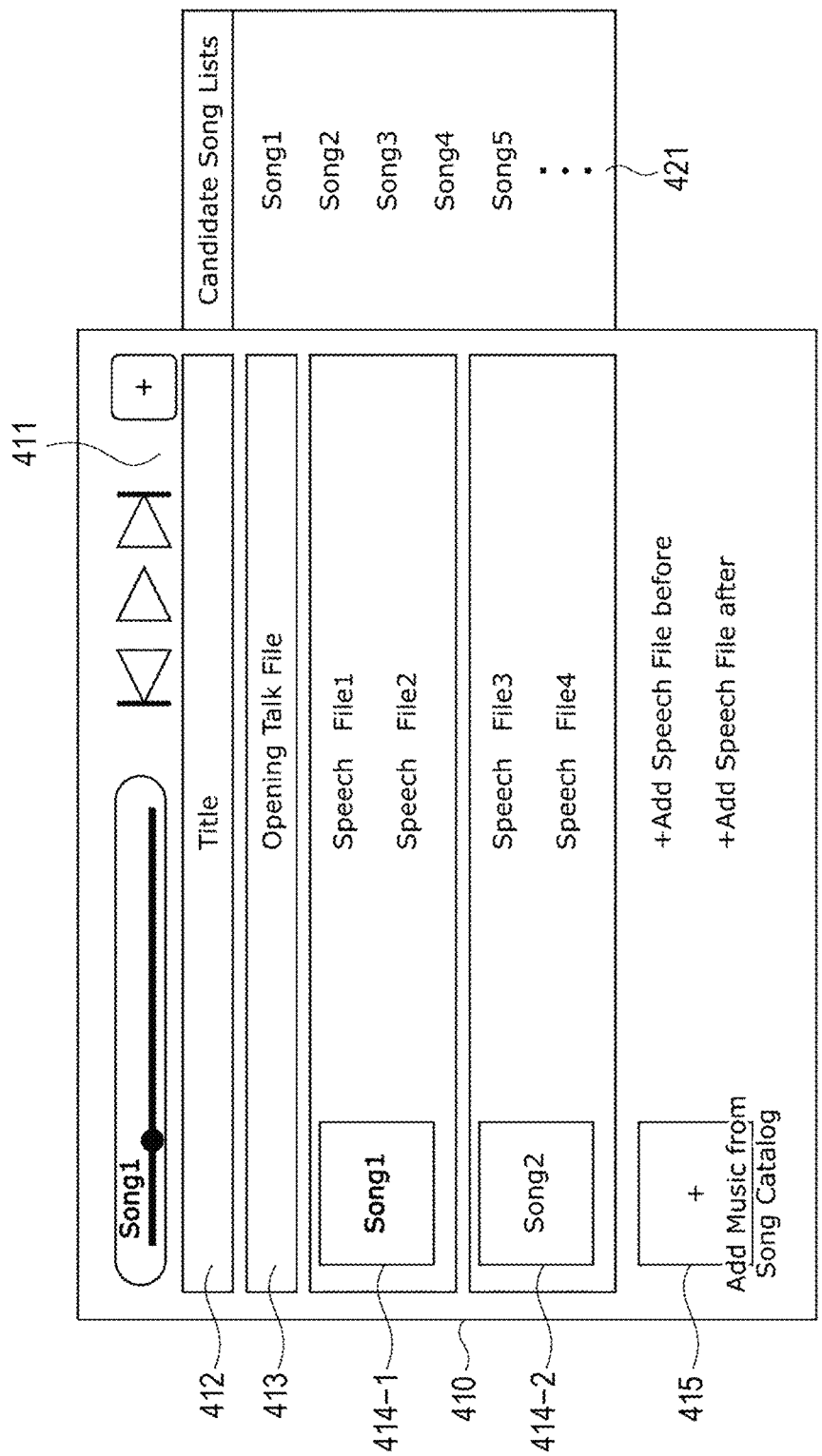
FIG. 18 is a diagram illustrating an example of a user interface of a program creation tool.

FIG. 18 illustrates an example of a user interface (UI) of the program creation tool.

In FIG. 18, a program creation screen 410 is a screen displayed when the program creation tool is executed, and is a UI for creating the podcast program.

The program creation screen 410 includes an operation area 411, a title setting area 412, an opening talk setting area 413, a set song foreword-afterword area 414, a song foreword-afterword setting area 415, and a song candidate list area 421.

The operation area 411 is an area for operating and listening to a song to be set in a program. The operation area 411 includes a button for reproducing or stopping the song, a button for selecting the previous song and the next song, a seek bar indicating the position of the song being reproduced, and the like.

The title setting area 412 is an area for setting the title of the program.

The opening talk setting area 413 is an area for setting an opening talk. For example, in the opening talk setting area 413, a voice file of the opening talk is set, but the voice file does not necessarily have to be set in a case where the opening talk is not necessary.

The set song foreword-afterword area 414 is an area in which the set song and the foreword and the afterword of the song are displayed.

For example, in the set song foreword-afterword area 414-1, a foreword of "Speech File1" and an afterword of "Speech File2" are set for the song of "Song1". Furthermore, in the set song foreword-afterword area 414-2, a foreword of "Speech File3" and an afterword of "Speech File4" are set for the song of "Song2".

The song foreword-afterword setting area 415 is an area for setting a song, and a foreword and an afterword of the song.

The song foreword-afterword setting area 415 includes a song addition button ("Add Music from Song Catalog") for selecting a file of a desired song from a catalog of songs, a foreword addition button ("Add Speech File before") for setting a desired foreword, and an afterword addition button ("Add Speech File after") for setting a desired afterword.

The song candidate list area 421 is an area in which a song candidate list (Candidate Song Lists) provided from the song distribution server 30B is displayed. In this example, "Song1", "Song2", "Song3", "Song4", "Song5", . . . , and so on are presented as the candidates for the song according to the reproduction history of the song such as the reproduction frequency of the creator.

The creator can select a desired song from at least songs that the creator has listened to by referring to the song candidates presented in the song candidate list area 421 of the program creation screen 410.

At this time, for example, in a case where the creator terminal device 10 is a device such as a smartphone having a touch panel, a desired song may be selected by a tap operation, or in a case where it is a device such as a personal computer having a mouse, it is only required to select a desired song by a click operation.

Furthermore, in the song candidate list area 421, in a case where the foreword and the afterword are already set to be browsable to the candidates for the song presented as the list, the foreword and the afterword may be presented together with the candidates of the song as reference information.

By the creator operating this program creation screen 410, for example, the following podcast program is created.

Opening talk ("Opening Talk File")
Foreword of first song ("Speech File1")→first song ("Song1")→afterword of first song ("Speech File2")
Foreword of second song ("Speech File3")→second song ("Song2")→afterword of second song ("Speech File4")

Note that, although not illustrated here because of repetition, the foreword and the afterword can be similarly set for the third and subsequent songs.

Returning to the description of FIG. 17, in the program creation tool, the script of the podcast program is generated on the basis of the song ID of the song selected from the song candidate list by the creator and the foreword and the afterword of the song (S13B), and is registered in the program distribution server 30A (S14).

Thereafter, as described with reference to the sequence diagram in FIG. 13, the podcast program is reproduced by the program renderer (S15 to S26).

In other words, in the program renderer, when an instruction to reproduce the podcast program published on the program distribution server 30A is given, the song distribution server 60B and the voice distribution server 60C are accessed on the basis of the script of the program, so that reproduction is repeated in the order of the foreword, the song, and the afterword for each song specified by the song ID.

The flow of processing in the case of presenting songs that the creator has listened to at the time of creating the program by the creator has been described above.

(Overall Image of Processing)

Figure 19:
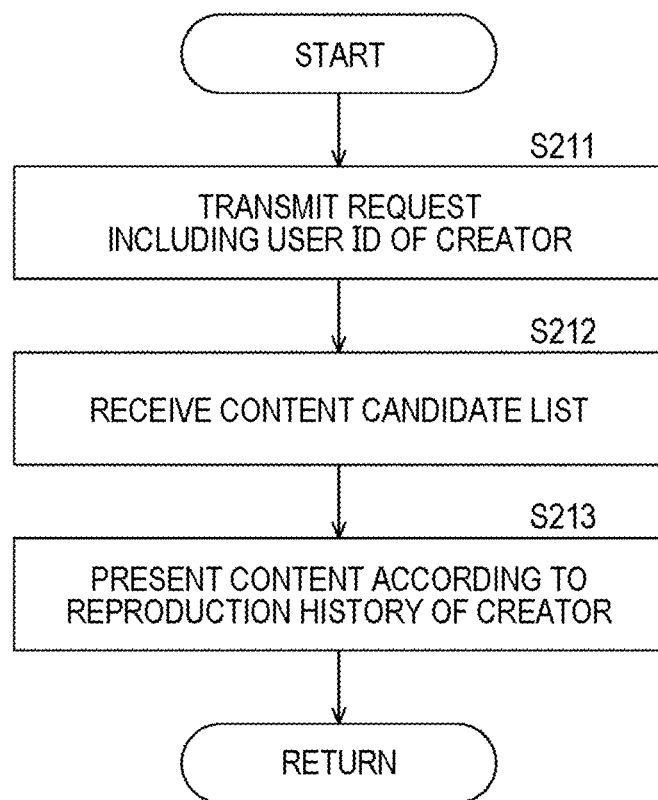
FIG. 19 is a flowchart describing an overall image of processing in a second embodiment.

FIG. 19 is a flowchart describing an overall image of processing in the second embodiment.

The processing illustrated in FIG. 19 is implemented by (the control unit 100 of) the creator terminal device 10 and (the control unit 300 of) the distribution server 30 in the content providing system to which the present technology is applied operating in cooperation. Note that the process illustrated in FIG. 19 is a process corresponding to the script generation support processing (S111) illustrated in FIG. 15.

In the content providing system 1, as illustrated in FIG. 19, the content candidate list is received in response to the request including the user ID of the creator (S211 and S212), and the content according to the content reproduction history of the creator is presented as the content candidate list on the interface for creating the script (S213).

In other words, in the creator terminal device 10, songs according to the reproduction history of songs by the creator are preferentially presented as the song candidate list transmitted from the song distribution server 30B on the UI of the program creation tool, and specification of song to be made into a program is supported. For example, the content candidate list may be presented in descending order of the frequency of the content reproduction history of the creator.

3. Third Embodiment

As a supporting method when a creator creates a podcast program, there is a method of presenting a newly automatically generated program to the creator.

As a method for automatically generating a program, by generating in advance a plurality of packages storing songs and forewords and afterwords of the songs and analyzing the forewords and the afterwords, it is possible to automatically generate the script of a new program on the basis of analysis results.

(Flow of Automatic Program Generation Processing)

Figure 20:
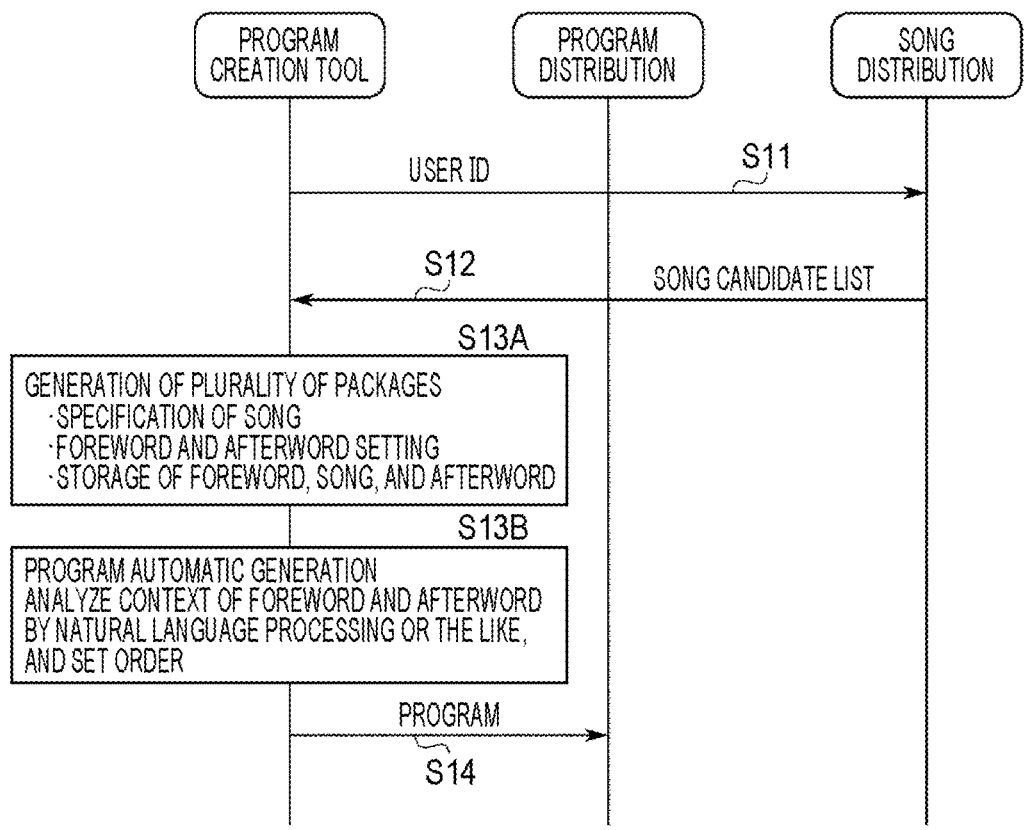
FIG. 20 is a sequence diagram illustrating a flow of processing in a case where the program is automatically generated and presented from a plurality of packages.

FIG. 20 is a sequence diagram illustrating a flow of processing in a case where a program is automatically generated and presented from a plurality of packages.

In steps S11 to S14 of FIG. 20, as described in steps S11 to S14 of FIG. 13, the script of the podcast program is generated by the program creation tool and registered in the program distribution server 30A.

At this time, when the creator creates the podcast program, the program creation tool automatically generates the new podcast program using the plurality of packages generated in advance and presents the program to the creator, thereby supporting generation of the script of the program.

In the program creation tool, the song is specified and the foreword and the afterword of the song are set, and a plurality of packages storing the song, the foreword, and the afterword are generated (S13A). Note that, in practice, it is assumed that the generation of the packages is performed in advance before starting the creation of the program.

The program creation tool automatically generates the script of the new program by analyzing the forewords and the afterwords stored in the plurality of packages (S13B). Here, the order of songs in the automatically generated program is set by analyzing the context of the foreword and the afterword by natural language processing or the like.

Figure 21:
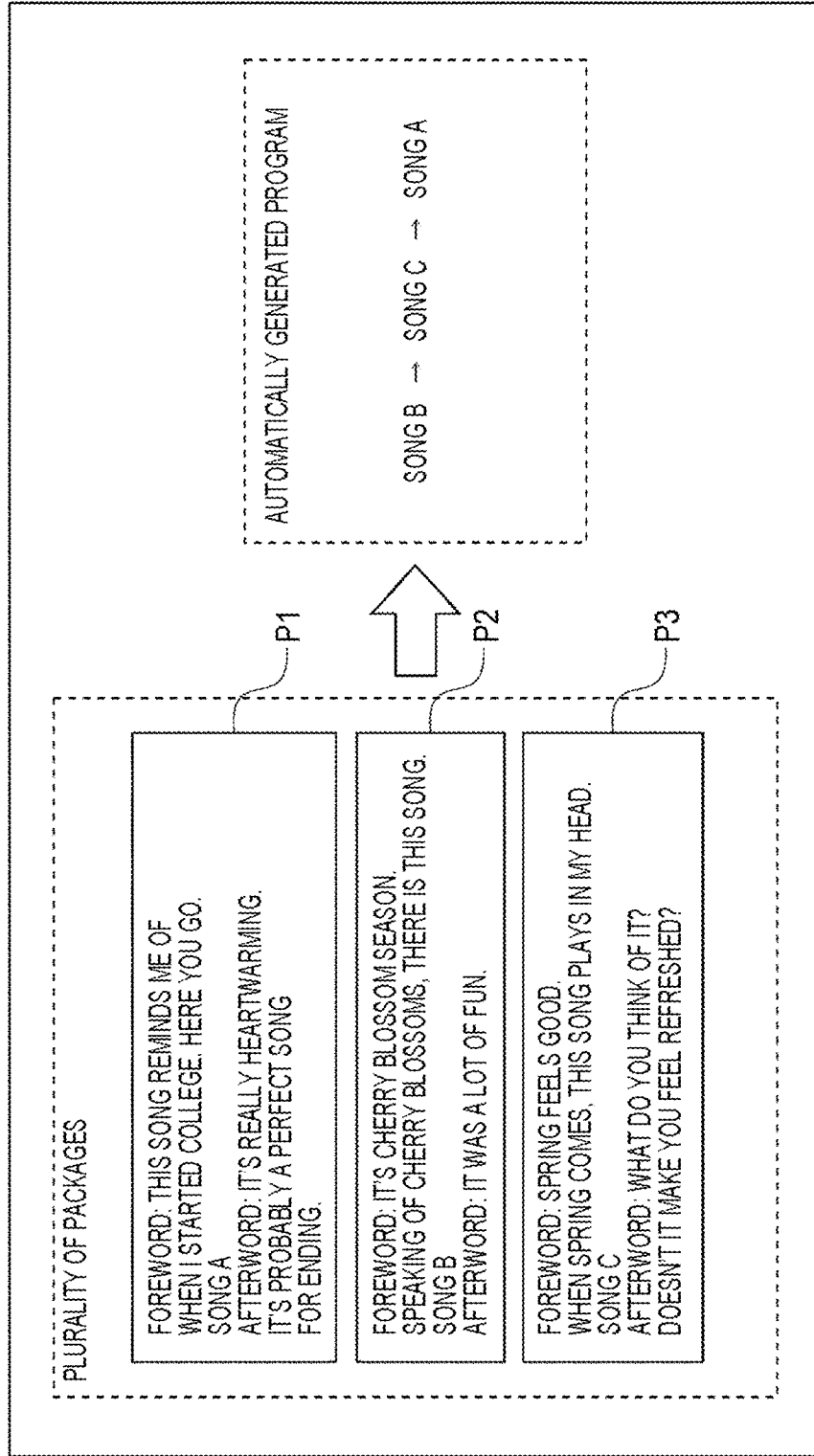
FIG. 21 is a diagram illustrating an example of the program automatically generated from the plurality of packages.

FIG. 21 illustrates an example of the program automatically generated from the plurality of packages.

FIG. 21 illustrates a case where the program is automatically generated from three packages P1 to P3.

The package P1 stores a foreword "This song reminds me of when I started college. Here you go", the song A, and an afterword "It's really heartwarming. It's probably a perfect song for ending".

The package P2 stores a foreword "It's the cherry blossom season. Speaking of cherry blossoms, there is this song", the song B, and an afterword "It was a lot of fun".

The package P3 stores a foreword "Spring feels good. When spring comes, this song plays in my head", the song C, and an afterword "What do you think of it? Doesn't it make you feel refreshed?"

In the example of FIG. 21, three packages P1 to P3 are specified from the keyword related to "spring", and the foreword and the afterword of each song are analyzed, so that a program reproduced in order of the song B, the song C, and the song A is generated as the automatically generated program.

In other words, since the song B is analyzed to be a song that is "a lot of fun" from the afterword of the song B stored in the package P2, the song B is set as the first song of the automatically generated program. Furthermore, from the afterword of the song A stored in the package P1, it is analyzed that the song A is the song "perfect for ending", and thus the song A is set as the third song at the last of the automatically generated program. Consequently, the remaining song C is set as the second song of the automatically generated program.

Returning to the description of FIG. 20, in the program creation tool, the automatically generated program generated in this manner is presented to the creator. The creator checks the content of the presented automatically generated program, and instructs to employ a program in a case where the creator employs the program, so that the script of the automatically generated program is registered in the program distribution server 30A (S14).

Note that, in checking the content of the automatically generated program, the creator may register the program after editing the foreword, the afterword, or the songs.

Thereafter, as described with reference to the sequence diagram in FIG. 13, the podcast program is reproduced by the program renderer (S15 to S26).

In other words, in the program renderer, when an instruction to reproduce the podcast program published on the program distribution server 30A is given, the song distribution server 60B and the voice distribution server 60C are accessed on the basis of the script of the program, so that reproduction is repeated in the order of the foreword, the song, and the afterword for each song specified by the song ID.

The flow of processing in a case where a program is automatically generated and presented from a plurality of packages has been described above.

(Overall Image of Processing)

Figure 22:
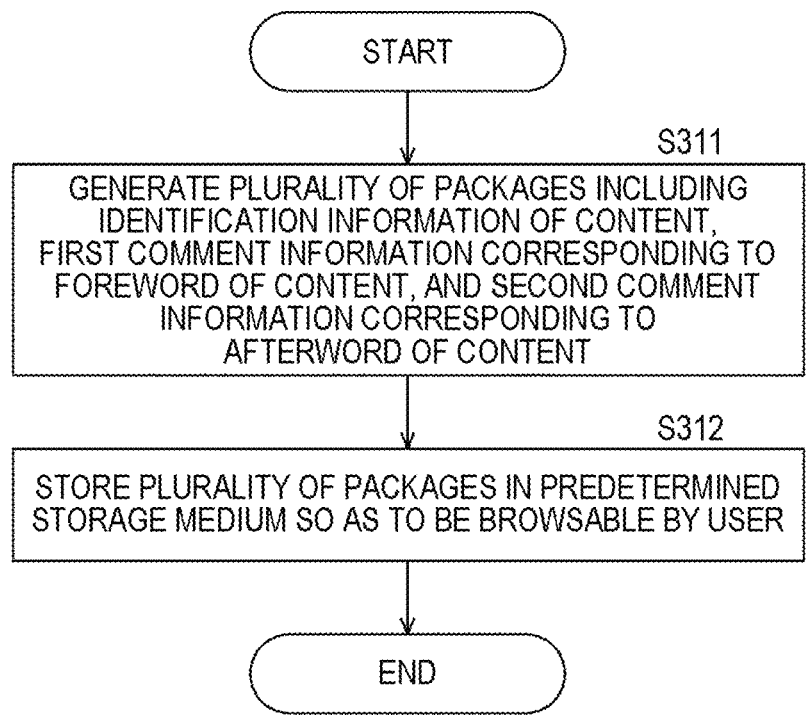
FIG. 22 is a flowchart describing an overall image of processing in a third embodiment.
Figure 23:
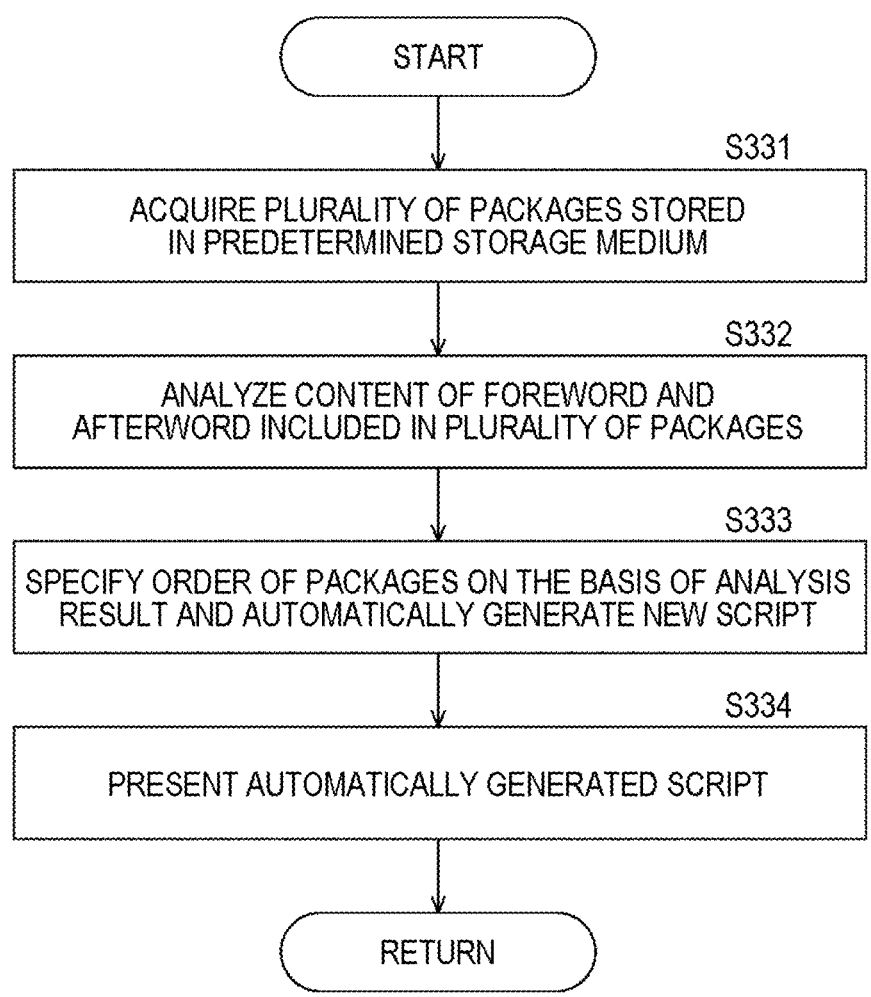
FIG. 23 is a flowchart describing an overall image of processing in the third embodiment.

FIGS. 22 and 23 are flowcharts describing an overall image of processing in the third embodiment.

The processing illustrated in FIGS. 22 and 23 is implemented by (the control unit 100 of) the creator terminal device 10 and (the control unit 300 of) the distribution server 30 in the content providing system to which the present technology is applied operating in cooperation.

In the content providing system 1, as illustrated in FIG. 22, a plurality of packages including the identification information of the content, first comment information corresponding to the foreword of the content, and second comment information corresponding to the afterword of the content is generated (S311), and the plurality of packages is stored in the predetermined storage medium so as to be browsable by the user using the user terminal device 20 (S312).

Here, the content includes the song and the like distributed by the music distribution service, and the identification information of the content includes the song ID and the like that can identify the song.

The first comment information includes ring information to the text of the foreword or the raw voice. The second comment information includes ring information to the text of the afterword or the raw voice. That is, the package includes the foreword, the song ID, and the afterword. The predetermined storage medium can be, for example, the database 353 of the program distribution server 30A.

Furthermore, in the content providing system 1, as illustrated in FIG. 23, a plurality of packages stored in the predetermined storage medium is acquired (S331), the contents of the foreword and the afterword included in the plurality of packages are analyzed (S332), the order of the packages is specified on the basis of the analysis result, and the new script is automatically generated (S333).

Then, the automatically generated new script is presented on the interface (S334).

That is, in the creator terminal device 10, (the script of) the automatically generated program is presented on the UI of the program creation tool. Here, pluralities of forewords and afterwords of the program are generated in advance as packages (forewords, songs, and afterwords), and the forewords and the afterwords are analyzed, so that a new program can be automatically generated and presented to the creator. Furthermore, for example, the program can be automatically generated by determining the arrangement order of the pluralities of forewords, songs, and afterwords from the contents of the forewords and the afterwords.

4. Fourth Embodiment

As a supporting method when a creator creates a podcast program, there is a method of presenting the popular foreword and afterword to the creator, or presenting related information of all media.

As a method of presenting the foreword and the afterword of the popularity, the foreword and the afterword of the popularity can be presented by specifying the most popular foreword and afterword from the user evaluation of forewords and afterwords of a specific song. Furthermore, related information of any medium such as a web page of an article related to the singer of the song or lyrics of the song published on the Internet may be presented.

(Flow of Popular Foreword and Afterword Presentation Processing)

Figure 24:
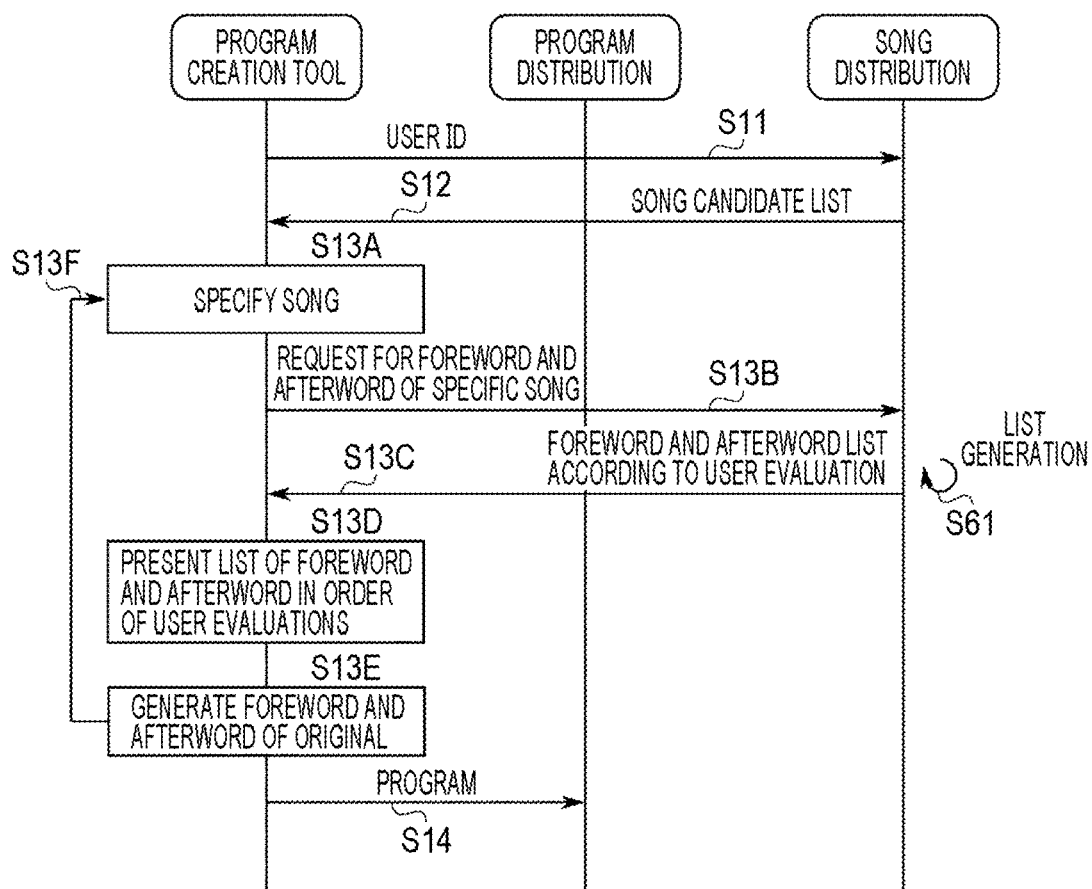
FIG. 24 is a sequence diagram illustrating a flow of processing in a case of presenting popular forewords and afterwords.

FIG. 24 is a sequence diagram illustrating a flow of processing in a case of presenting the popular foreword and afterword.

In steps S11 to S14 of FIG. 24, as described in steps S11 to S14 of FIG. 13, the script of the podcast program is generated by the program creation tool and registered in the program distribution server 30A.

At this time, when the creator creates the podcast program, the program creation tool supports generation of the script of the program by specifying the most popular foreword and afterword from user evaluations of the forewords and afterwords of the specific song, and thereby presenting the popular foreword and afterword.

In the program creation tool, the song candidate list provided from the song distribution server 30B is presented to the creator, so that the desired song is specified from the song candidate list according to an operation of the creator (S13A).

Figure 25:
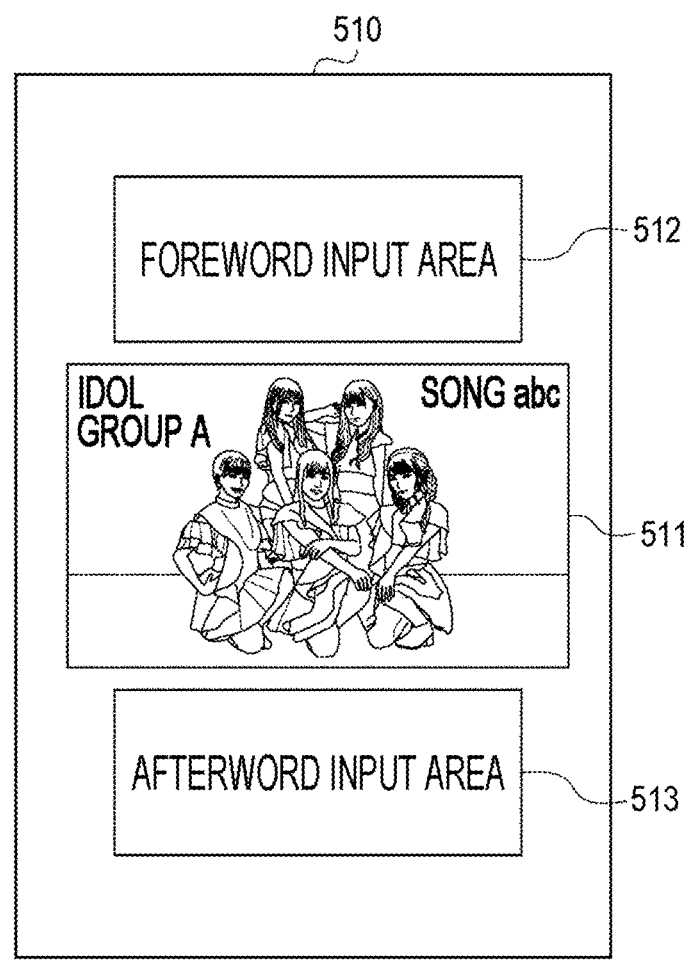
FIG. 25 is a diagram illustrating an example of a program creation screen including input areas for the foreword and the afterword.

FIG. 25 illustrates an example of a UI of the program creation tool.

In FIG. 25, a program creation screen 510 is a screen displayed when the program creation tool is executed, and is a UI for creating the podcast program. The program creation screen 510 includes a song selection area 511, a foreword input area 512, and an afterword input area 513.

The song selection area 511 is an area for selecting a song to be set in the program. In the example of FIG. 25, since the creator has selected the "song abc" of the "idle group A" as the desired song from the song candidate list, an image of a jacket of the song is displayed in the song selection area 511.

The foreword input area 512 is an area for inputting the foreword of a song. For example, in a case where the creator terminal device 10 is a device such as a smartphone having a touch panel, the creator can perform a tap operation on a software keyboard displayed on the display unit 121 on which the touch panel is superimposed to input a desired comment of the foreword as text.

Furthermore, in a case where the creator terminal device 10 can use a service of a voice recognition application programming interface (API) on the cloud, a voice input of a desired foreword by the creator may be converted into a text using the voice recognition service. Alternatively, in a case where the creator terminal device 10 is a device such as a personal computer having a keyboard, it is only required to operate the keyboard to input a comment of a desired foreword.

The afterword input area 513 is an area for inputting the afterword of a song. In the afterword input area 513, a comment of a desired afterword according to an operation of a software keyboard or an operation of voice input by a creator is input.

Returning to the description of FIG. 24, the program creation tool requests the song distribution server 30B for foreword and afterword of the specific song (S13B). In the song distribution server 30B, the list of forewords and afterwords according to the user evaluation is generated in response to the request from the program creation tool (S61). The generated list is transmitted to the program creation tool (S13C).

Thus, the program creation tool receives the list from the song distribution server 30B, and presents the list of forewords and afterwords to the creator in the order of user evaluations (S13D).

FIG. 26 illustrates an example of presentation of ranking of the foreword and the afterword of the song.

In FIG. 26, foreword and afterword ranking 521 illustrates the ranking of the forewords and the afterwords of the song abc specified by the creator.

In the example of FIG. 26, as the ranking of the forewords and the afterwords of the song abc, the first place is "foreword A" and "afterword B", the second place is "foreword C" and "afterword D", the third place is "foreword E" and "afterword F", the fourth place is "foreword G" and "afterword H", and the fifth place is "foreword I" and "afterword J".

Returning to the description of FIG. 24, the creator checks the content of the ranking of the presented forewords and afterwords, and inputs the forewords and the afterwords to the foreword input area 512 and the afterword input area 513 of the program creation screen 510 (FIG. 25) by, for example, referring to the popular foreword and afterword, and thus the original foreword and the afterword are generated (S13E).

Thus, for example, the song ID of the song abc is set as the first song of the podcast program, and the forewords and the afterwords according to the ranking of popularity are set as the foreword and the afterword of the song abc. Furthermore, in a case where there is a second or subsequent song to be programmed, the processing returns to step S13A (S13F), and the processing of steps S13A to S13F is repeated.

Then, when the programming of the song is completed, the script of the podcast program is registered in the program distribution server 30A (S14).

Thereafter, as described with reference to the sequence diagram in FIG. 13, the podcast program is reproduced by the program renderer (S15 to S26).

In other words, in the program renderer, when an instruction to reproduce the podcast program published on the program distribution server 30A is given, the song distribution server 60B and the voice distribution server 60C are accessed on the basis of the script of the program, so that reproduction is repeated in the order of the foreword, the song, and the afterword for each song specified by the song ID.

The flow of the processing in the case of presenting the popular foreword and afterword has been described above.

In the above description, the case where creation of the foreword and the afterword is supported by presenting the ranking of popularity to the creator has been exemplified, but the support method at the time of creating the foreword and the afterword is not limited thereto, and other support methods may be used.

FIG. 27 illustrates an example of presentation of a foreword and an afterword which are similar.

In FIG. 27, a similar comment 531 indicates the foreword of a similar song of the "song abc" specified by the creator. In FIG. 27, the "song xyz" of the "idle group A" is selected as the similar song of the "song abc", and the foreword of the "song xyz" is presented.

For example, the creator can input the foreword of the "song abc" into the foreword input area 512 of the program creation screen 510 (FIG. 25) by, for example, checking the foreword of the "song xyz", which is a similar song of the "song abc", and referring to the foreword.

FIG. 28 illustrates an example of presentation of lyrics of a song.

In FIG. 28, a song lyrics 541 indicate the lyrics of the "song abc" specified by the creator. In FIG. 28, "Oh . . . abc abc abc . . . " is presented as the lyrics of the "song abc".

For example, the creator checks the lyrics of the "song abc" and refers to the lyrics to input the foreword and the afterword of the "song abc" in the foreword input area 512 and the afterword input area 513 of the program creation screen 510 (FIG. 25).

FIG. 29 illustrates an example of presentation of a related web page.

In FIG. 29, a web page 551 indicates a web page of an article related to "idle group A" singing "song abc" specified by the creator.

For example, the creator can input the foreword and the afterword of the "song abc" in the foreword input area 512 and the afterword input area 513 of the program creation screen 510 (FIG. 25) by checking an article related to the "idle group A" and referring to the article.

In this way, it is possible to support creation of a program by a creator by presenting related information of various media as a UI of a program creation tool.

Note that, as the information for supporting the creation of the program by the creator, for example, information such as a brief history of the artist, a talk of a time when the selected song is released, an episode regarding the selected song, transition of ranking, statistical information such as the number of sales and the number of downloads, information of the world when the song is released, and tie-up information may be presented. Moreover, information such as information that the creator himself or herself has, for example, tweeted about the song or mentioned on a blog in the past, information on which live show the song has been released, a link with the past information of the creator (user) (at that time, the creator himself or herself was a student, or the like) may be included.

(Overall Image of Processing)

Figure 30:
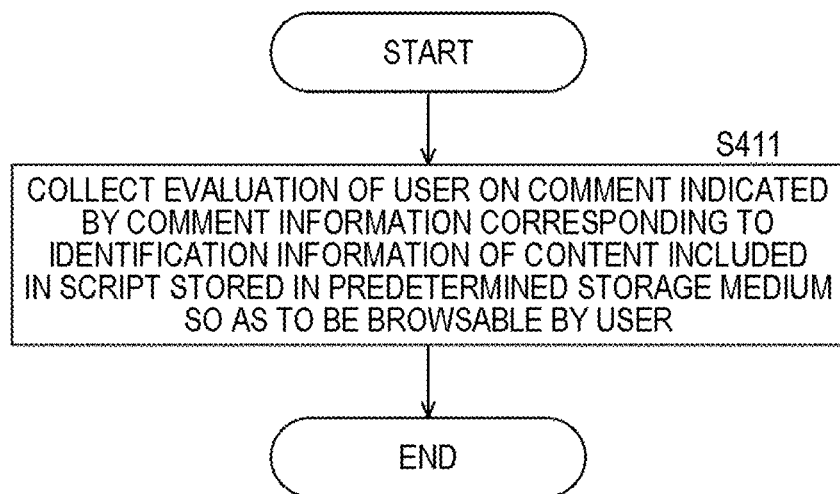
FIG. 30 is a flowchart describing an overall image of processing in a fourth embodiment.
Figure 31:
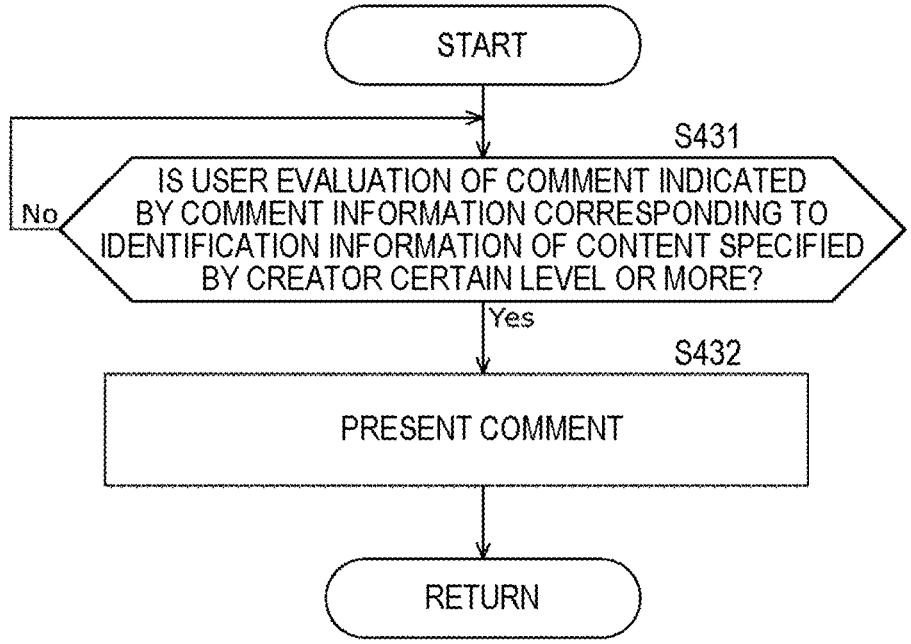
FIG. 31 is a flowchart describing an overall image of processing in the fourth embodiment.

FIGS. 30 and 31 are flowcharts describing an overall image of processing in the fourth embodiment.

The processing illustrated in FIGS. 30 and 31 is implemented by (the control unit 100 of) the creator terminal device 10 and (the control unit 300 of) the distribution server 30 in the content providing system to which the present technology is applied operating in cooperation.

In the content providing system 1, as illustrated in FIG. 30, the user's evaluation on the comment indicated by the comment information corresponding to the identification information of the content included in the script stored in the predetermined storage medium to be browsable by the user is collected (S411).

Here, the predetermined storage medium can be, for example, the database 353 of the program distribution server 30A.

The content includes the song and the like distributed by the music distribution service, and the identification information of the content includes the song ID and the like that can identify the song. The comment information includes text indicating the comment, link information to the raw voice of the creator, or the like. The comment is, for example, the foreword and the afterword set in the song, and at least one of the foreword or the afterword is only required to be set.

Furthermore, in the content providing system 1, as illustrated in FIG. 31, in a case where the user evaluation of the comment indicated by the comment information corresponding to the identification information of the content specified by the creator is equal to or more than a certain level ("Yes" in S431), the comment is presented on the interface that generates the script (S432).

That is, in the creator terminal device 10, the foreword and afterword ranking 521 in FIG. 26 and the like are presented on the UI of the program creation tool as the foreword and afterword list according to the user evaluation transmitted from the song distribution server 30B.

5. Fifth Embodiment

As a supporting method when a creator creates a podcast program, there is a method of returning a revenue to the creator in a case where the foreword or the afterword is quoted.

For example, as a method of returning the revenue, in a case where a certain creator registers (uploads) the foreword and the afterword quoted from another creator as his or her own program, a part of the revenue can be returned to the another creator of the quoted foreword and afterword.

At this time, credit information of the producer (other creators) of the quoted foreword and afterword is given as metadata of the script of the podcast program.

(Other Configurations of System)

Figure 32:
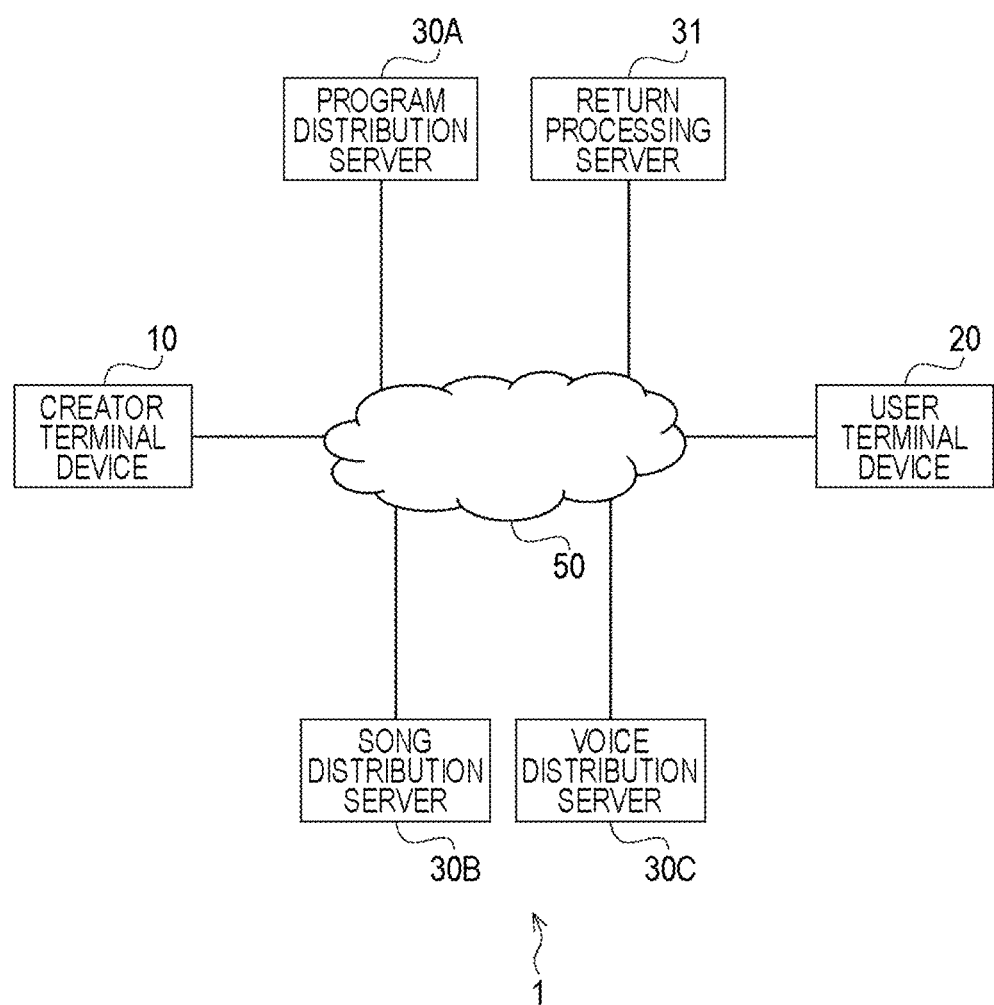
FIG. 32 is a diagram illustrating an example of another configuration of an embodiment of a content providing system to which the present technology is applied.

FIG. 32 illustrates an example of another configuration of an embodiment of the content providing system to which the present technology is applied.

In FIG. 32, as in FIG. 8, the content providing system 1 includes the creator terminal device 10, the user terminal device 20, the program distribution server 30A, the song distribution server 30B, and the voice distribution server 30C, but a return processing server 31 is further provided.

In response to a request from the program distribution server 30A, the return processing server 31 performs return processing for returning a reward obtained in program distribution to the creator.

Note that the return processing server 31 has a configuration similar to the configuration of the distribution server 30 illustrated in FIG. 11.

(Flow of Foreword and Afterword Quotation Return Processing)

Figure 33:
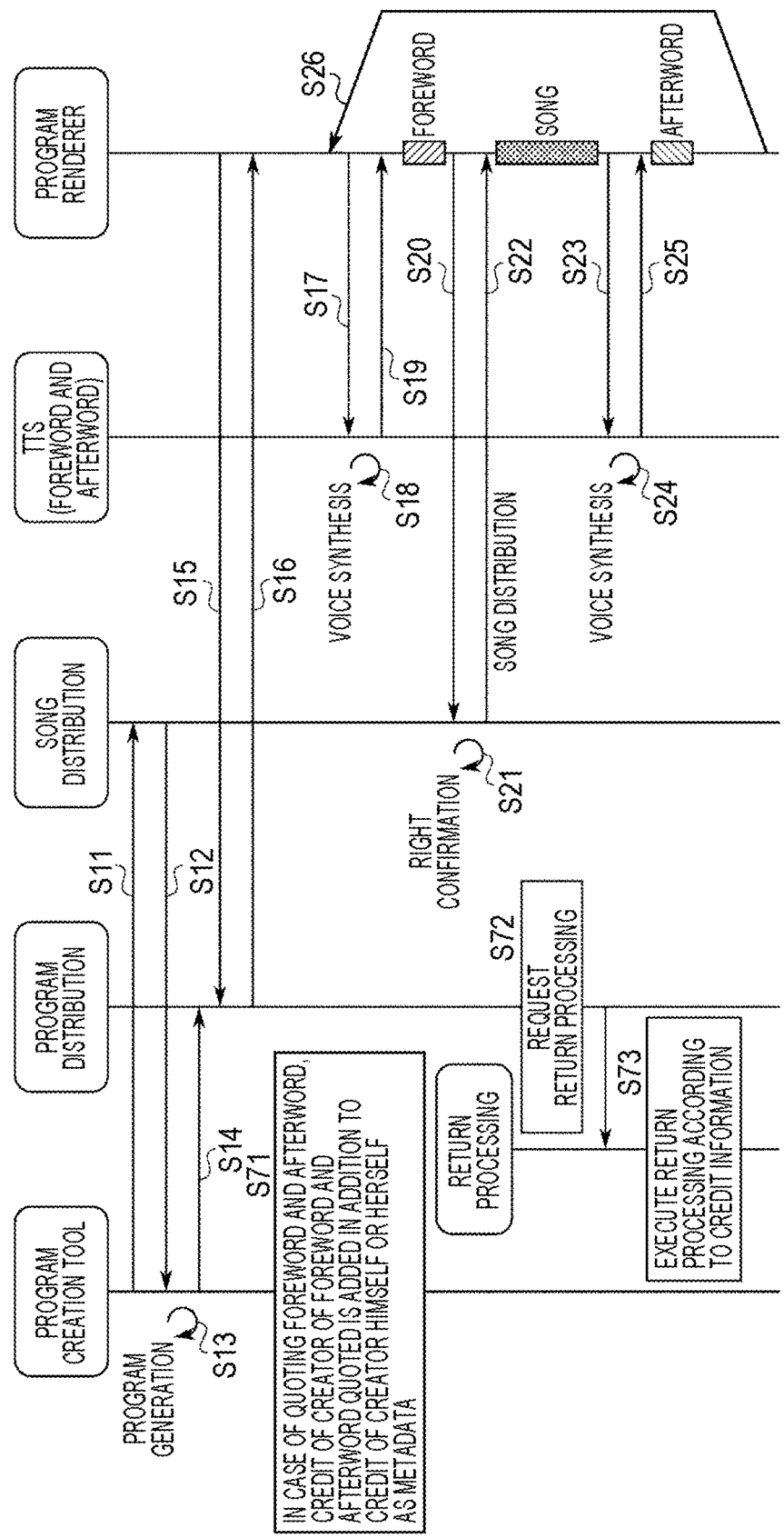
FIG. 33 is a sequence diagram illustrating an example of a case where return processing is performed when the foreword and the afterword are quoted.

FIG. 33 is a sequence diagram illustrating an example of a case where the return processing is performed when the foreword and the afterword are quoted.

In steps S11 to S14 of FIG. 33, as described in steps S11 to S14 of FIG. 13, the script of the podcast program is generated by the program creation tool and registered in the program distribution server 30A.

At this time, in the program creation tool, in a case where the creator has quoted the foreword and the afterword created by another creator when creating the podcast program, credit information of the another creator is added in addition to the credit information of the creator himself or herself as metadata of the script of the program (S71).

In steps S15 to S26 in FIG. 33, the podcast program is reproduced by the program renderer as described in steps S15 to S26 in FIG. 13.

In other words, in the program renderer, when an instruction to reproduce the podcast program published on the program distribution server 30A is given, the song distribution server 60B and the voice distribution server 60C are accessed on the basis of the script of the program, so that reproduction is repeated in the order of the foreword, the song, and the afterword for each song specified by the song ID.

At this time, the program distribution server 30A requests the return processing server 31 to perform the return processing in response to the program distribution of the podcast (S72). This request includes credit information added as metadata to the program script.

In the return processing server 31, the return processing according to the credit information is executed in response to the request from the program distribution server 30A (S73).

By this return processing, the reward obtained in the program distribution of the podcast is returned to the creator included in the credit information. In this example, in addition to the creator who created the program with the program creation tool, the reward obtained in the program distribution is also returned to the other creator who created the foreword and the afterword quoted in the program.

For example, in a case where the program is created by a plurality of creators, a contribution rate according to the number of characters or the like is clearly described, and the reward may be distributed according to the contribution rate. Furthermore, the return rate at the time of return of the reward may be changed between a case of quoting all and a case of quoting some as the quotation of the foreword and the afterword.

Furthermore, as another method of returning the revenue, the amount of the revenue to be returned to the creator may be, for example, reduced in a case where the program of the podcast created by the creator is viewed by a free user who uses the music distribution service for free than in a case where the program of the podcast is viewed by a premium user who has a pay contract to the music distribution service.

(Overall Image of Processing)

Figure 34:
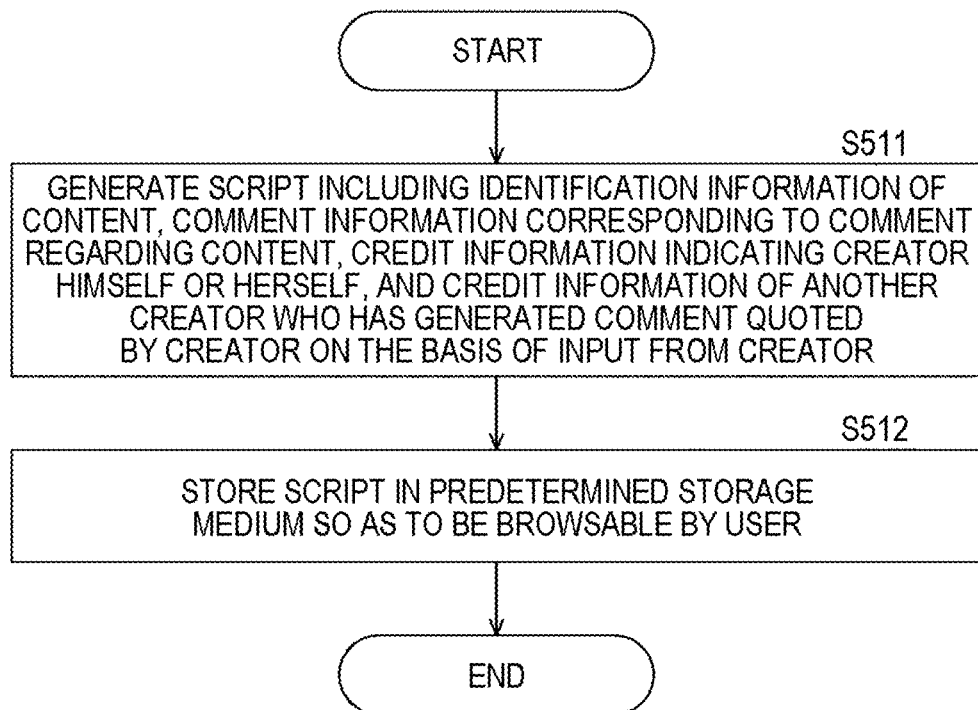
FIG. 34 is a flowchart describing an overall image of processing in a fifth embodiment.
Figure 35:
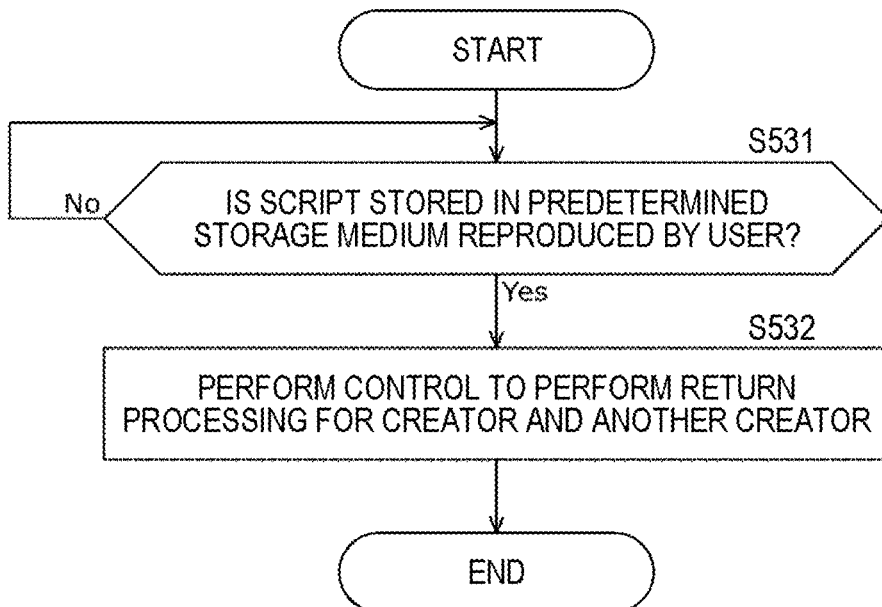
FIG. 35 is a flowchart describing an overall image of processing in the fifth embodiment.

FIGS. 34 and 35 are flowcharts for describing an overall image of processing in a fifth embodiment.

The processing illustrated in FIGS. 34 and 35 is implemented by (the control unit 100 of) the creator terminal device 10 and (the control unit 300 of) the distribution server 30 in the content providing system to which the present technology is applied operating in cooperation.

In the content providing system 1, as illustrated in FIG. 34, a script including identification information of content, comment information corresponding to a comment regarding the content, credit information indicating the creator himself or herself, and credit information of another creator who has generated a comment quoted by the creator is generated on the basis of an input from the creator (S511), and the script is stored in the predetermined storage medium to be browsable by the user (S512).

Here, the content includes the song and the like distributed by the music distribution service, and the identification information of the content includes the song ID and the like that can identify the song. The comment information includes text indicating the comment, link information to the raw voice of the creator, or the like. The comment is, for example, the foreword and the afterword set in the song, and at least one of the foreword or the afterword is only required to be set. Note that the script can include link information for accessing the quoted comment.

The creator includes not only the producer of the program but also the producer of the foreword and the producer of the afterword. For example, in a case where the foreword and the afterword are quoted, the credit information includes not only the credit of the creator as the producer of the program but also the credit of another creator as the producer of the quoted foreword and afterword. The credit information may include information used when the return processing such as a contribution rate is performed. The predetermined storage medium can be, for example, the database 353 of the program distribution server 30A.

Furthermore, in the content providing system 1, as illustrated in FIG. 35, in a case where the script stored in the predetermined storage medium is reproduced by the user ("Yes" in S531), it is controlled to perform the return processing for the creator and the another creator in accordance with reproduction of the script (S532).

That is, in a case where the program distribution server 30A distributes the script of the program in response to the request from the user terminal device 20, the return processing server 31 is caused to perform the return processing according to the credit information related to the program.

6. Modification Example

In voice synthesis, for example, phonemes of a celebrity can be purchased as phonemes of the TTS, phonemes of a user or a creator himself or herself can be used, or artificial phonemes not associated with a specific person can be used.

The song order of the songs to be programmed may be the same as the order of the past list (for example, a playlist) that the creator himself or herself listened to in the past, or may be arranged in chronological order on the basis of the peak period of the frequency of the reproduction history of each song. The order of songs to be programmed may be the order of the release year of the songs.

The foreword and the afterword are not limited to the TTS voice, and may be, for example, a voice (raw voice) recorded by a person such as a creator. The input of the foreword and the afterword is not limited to the keyboard operation or the touch operation, and may be performed by voice input.

7. Configuration of Computer

The processing of each step of the above-described flowchart can be executed by hardware or software. In a case where the series of processes is executed by software, a program constituting the software is installed in a computer of each device.

The program executed by the computer can be provided, for example, by being recorded in a removable recording medium as a package medium or the like. Furthermore, the program can be provided via a wired or wireless transmission medium such as a local area network, the Internet, or digital satellite broadcasting.

In the computer, the program can be installed in the storage unit via the input-output I/F by attaching the removable recording medium to the drive. Furthermore, the program can be received by the communication unit via a wired or wireless transmission medium and installed in the storage unit. In addition, the program can be installed in advance in the ROM or the storage unit.

Here, in the present description, the processing performed by the computer according to the program does not necessarily have to be performed in time series in the order described as the flowchart. That is, the processing performed by the computer according to the program also includes processing that is executed in parallel or individually (for example, parallel processing or object processing).

Furthermore, the program may be processed by one computer (processor) or may be processed in a distributed manner by a plurality of computers. Moreover, the program may be transferred to a remote computer and executed.

Moreover, in the present description, a system means a set of a plurality of components (devices, modules (parts), and the like), and it does not matter whether or not all components are in the same housing. Therefore, both of a plurality of devices housed in separate housings and connected via a network and a single device in which a plurality of modules is housed in one housing are systems.

Note that the embodiments of the present technology are not limited to the above-described embodiments, and various modifications are possible without departing from the gist of the present technology. For example, the present technology can take a configuration of cloud computing in which one function is shared by a plurality of devices via a network and processed jointly.

Furthermore, each step described in the above-described flowcharts can be executed by one device, or can be executed in a shared manner by a plurality of devices. Moreover, in a case where a plurality of processes is included in one step, the plurality of processes included in the one step can be executed in a shared manner by a plurality of devices in addition to being executed by one device.

Furthermore, the effects described in the present description are merely examples and are not limited, and other effects may be provided.

Note that the present technology can also employ the following configurations.

(1)

An information processing system including a control unit that generates a script including identification information of content and comment information on the basis of an input from a creator, and performs control to store the script in a predetermined storage medium to be browsable by a user, in which the control unit has a function of supporting generation of the script by the creator.

(2)

The information processing system according to (1) above, in which the control unit preferentially presents content according to a content reproduction history of the creator as a candidate list of content on an interface that generates the script.

(3)

The information processing system according to (1) or (2) above, in which a plurality of packages each including identification information of content, first comment information corresponding to a foreword introducing the content, and second comment information corresponding to an afterword after provision of the content is stored in the predetermined storage medium, and the control unit automatically generates a new script by specifying an order of the packages by analyzing contents of the foreword and the afterword of the plurality of packages, and presents the new script on an interface that generates the script.

(4)

The information processing system according to any one of (1) to (3) above, in which user evaluations on a comment indicated by the comment information corresponding to the identification information of the content included in the script stored in the predetermined storage medium to be browsable by the user are collected, and the control unit presents, on an interface that generates the script, a comment having a user evaluation of a certain level or more among comments indicated by the comment information corresponding to the identification information of content specified by the creator.

(5)

The information processing system according to any one of (1) to (4) above, in which the control unit presents related information of a person related to the content on an interface that generates the script.

(6)

The information processing system according to any one of (1) to (4) above, in which the control unit generates, on the basis of an input from the creator, a script including identification information of content and comment information, credit information indicating the creator himself or herself, and credit information of another creator who has generated a comment quoted by the creator, controls to store the script in the predetermined storage medium to be browsable by a user, and controls to perform return processing on the creator and the another creator according to reproduction of the script.

(7)

The information processing system according to (6) above, in which the control unit controls link information for accessing the quoted comment to be included in the script.

(8)

The information processing system according to (6) or (7) above, in which the credit information is metadata of the script.

(9)

The information processing system according to (4), (6), or (7) above, in which the content includes a song, and the comment includes at least one of a foreword or an afterword set to the song.

(10)

The information processing system according to any one of (1) to (9) above, further including a first terminal device used by the creator;

a second terminal device used by the user;

a first server that has the predetermined storage medium storing the script; and a second server that distributes the content.

(11)

An information processing method including:

by an information processing device, generating a script including identification information of content and comment information on the basis of an input from a creator, and performing control to store the script in a predetermined storage medium to be browsable by a user; and supporting generation of the script by the creator.

(12)

A storage medium recording a program for causing a computer to function as an information processing device including a control unit that generates a script including identification information of content and comment information on the basis of an input from a creator, and performs control to store the script in a predetermined storage medium to be browsable by a user, in which the control unit has a function of supporting generation of the script by the creator.

REFERENCE SIGNS LIST

1 Content providing system
10 Creator terminal device
20 User terminal device
30 Distribution server
30A Program distribution server
30B Song distribution server
30C Voice distribution server
31 Return processing server
50 Network
100 Control unit
101 CPU
102 ROM
103 RAM
104 Bus
105 Input unit
106 Output unit
107 Storage unit
108 Communication unit
109 Near-field wireless communication unit
110 Input-output I/F
111 Operation unit
112 Camera unit
113 Sensor unit
121 Display unit
122 Sound output unit
151 Input reception unit
152 Song information acquisition unit
153 Program generation unit
154 Voice information acquisition unit
155 Voice generation unit
156 Registration unit 157 Support unit
300 Control unit
301 CPU
302 ROM
303 RAM
304 Bus
305 Input unit
306 Output unit
307 Storage unit
308 Communication unit
309 Drive
310 Input-output I/F
351 Request reception-response unit
352 Distribution processing unit
353 Database

The invention claimed is:

1. An information processing system comprising:
a predetermined storage medium; and
control circuitry that generates a script including identification information of content and comment information on a basis of an input from a creator, and performs control to store the script in a predetermined storage medium to be browsable by a user,
wherein the control circuitry has a function of supporting generation of the script by the creator, and
a plurality of packages each including identification information of content, first comment information corresponding to a foreword introducing the content, and second comment information corresponding to an afterword after provision of the content is stored in the predetermined storage medium, and
the control circuitry is further configured to
automatically generate a new script by specifying an order of the packages by analyzing contents of the foreword and the afterword of the plurality of packages, and
present the new script on an interface that generates the script.

2. The information processing system according to claim 1, wherein
the control circuitry preferentially presents content according to a content reproduction history of the creator as a candidate list of content on an interface that generates the script.

3. The information processing system according to claim 1, wherein
user evaluations on a comment indicated by the comment information corresponding to the identification information of the content included in the script stored in the predetermined storage medium to be browsable by the user are collected, and
the control circuitry presents, on an interface that generates the script, a comment having a user evaluation of a certain level or more among comments indicated by the comment information corresponding to the identification information of content specified by the creator.

4. The information processing system according to claim 3, wherein
the control circuitry presents related information of a person related to the content on an interface that generates the script.

5. The information processing system according to claim 1, wherein
the control circuitry
generates, on a basis of an input from the creator, a script including identification information of content and comment information, credit information indicating the creator himself or herself, and credit information of another creator who has generated a comment quoted by the creator,
controls to store the script in the predetermined storage medium to be browsable by a user, and
controls to perform return processing on the creator and the another creator according to reproduction of the script.

6. The information processing system according to claim 5, wherein
the control circuitry controls link information for accessing the quoted comment to be included in the script.

7. The information processing system according to claim 5, wherein the credit information is metadata of the script.

8. The information processing system according to claim 3, wherein
the content includes a song, and
the comment includes at least one of a foreword or an afterword set to the song.

9. The information processing system according to claim 1, further comprising:
a first terminal device used by the creator;
a second terminal device used by the user;
a first server that has the predetermined storage medium storing the script; and
a second server that distributes the content.

10. An information processing method comprising:
by an information processing device,
generating a script including identification information of content and comment information on a basis of an input from a creator, and performing control to store the script in a predetermined storage medium to be browsable by a user;
supporting generation of the script by the creator, a plurality of packages each including identification information of content, first comment information corresponding to a foreword introducing the content, and second comment information corresponding to an afterword after provision of the content is stored in the predetermined storage medium;
automatically generating a new script by specifying an order of the packages by analyzing contents of the foreword and the afterword of the plurality of packages; and
presenting the new script on an interface that generates the script.

11. A non-transitory storage medium that has a program stored therein that upon execution by a computer causes the computer to function as an information processing device comprising
a control circuitry that generates a script including identification information of content and comment information on a basis of an input from a creator, and performs control to store the script in a predetermined storage medium to be browsable by a user,
wherein the control circuitry has a function of supporting generation of the script by the creator, and
a plurality of packages each including identification information of content, first comment information corresponding to a foreword introducing the content, and second comment information corresponding to an afterword after provision of the content is stored in the predetermined storage medium, and the control circuitry is further configured to
automatically generate a new script by specifying an order of the packages by analyzing contents of the foreword and the afterword of the plurality of packages, and
present the new script on an interface that generates the script.

* * * * *